United States Patent [19]
Furukata et al.

[11] Patent Number: 6,048,103
[45] Date of Patent: Apr. 11, 2000

[54] POLARIZATION INDEPENDENT OPTICAL ISOLATOR WITH INTEGRALLY ASSEMBLED BIREFRINGENT CRYSTAL ELEMENT AND FARADAY ROTATOR

[75] Inventors: Yukiko Furukata; Yasushi Sato, both of Tokyo; Tetsuya Suga, Yokohama, all of Japan

[73] Assignee: Kyocera Corporation, Kyoto, Japan

[21] Appl. No.: 09/325,318

[22] Filed: Jun. 3, 1999

Related U.S. Application Data

[63] Continuation of application No. 08/587,767, Dec. 21, 1995, abandoned.

[51] Int. Cl.[7] ................................. G02B 6/38
[52] U.S. Cl. ......................................... 385/73
[58] Field of Search ....................... 359/497, 484, 359/495; 385/11, 24, 35, 73, 65, 93, 61, 96, 88, 89, 147

[56] References Cited

U.S. PATENT DOCUMENTS

| | | |
|---|---|---|
| 4,548,478 | 10/1985 | Shirasaki . |
| 5,033,830 | 7/1991 | Jameson . |
| 5,276,747 | 1/1994 | Pan . |
| 5,278,853 | 1/1994 | Shirai et al. . |
| 5,293,438 | 3/1994 | Yoshihiro et al. ........................ 385/35 |
| 5,315,431 | 5/1994 | Masuda et al. . |
| 5,408,491 | 4/1995 | Hirai et al. . |
| 5,499,307 | 3/1996 | Iwatsuka . |
| 5,557,692 | 9/1996 | Jing-Jong ................... 385/11 |
| 5,691,845 | 11/1997 | Shinji et al. ............................ 359/497 |
| 5,706,371 | 1/1998 | Jing-Jong ................... 385/11 |
| 5,930,418 | 7/1999 | Wai ......................................... 385/24 |

FOREIGN PATENT DOCUMENTS

| | | |
|---|---|---|
| 343489 | 11/1989 | European Pat. Off. . |
| 472728 | 3/1992 | European Pat. Off. . |
| 575993 | 12/1993 | European Pat. Off. . |
| 4225029 | 3/1994 | Germany . |
| 4246615 | 9/1992 | Japan . |

OTHER PUBLICATIONS

Kazuo Shiraishi et al., "Fiber–Embedded in–Line Isolator," *Journal of Lightwave Technology*, vol. 9, No. 4, Apr., 1991.
Kok Wai Chang et al., "High–performance single–mode fiber polarization–independent isolator," *Optics Letters*, vol. 15, No. 8, Apr. 15, 1990.

*Primary Examiner*—Akm E. Ullah
*Attorney, Agent, or Firm*—Loeb & Loeb, LLP

[57] ABSTRACT

Adapter-type optical isolator 1 has split sleeve 7 within housings A and B. Polarization-independent optical isolator is of such a structure that optical isolator device 3 which is an integral assembly of a Faraday rotator and a birefringent crystal element is provided within hollow cylindrical magnet 4. Beam changing elements 5a and 5b are in the form of optical coupling lenses or core-flared fibers. Adapter-type optical isolator 1 has the polarization-independent optical isolator and beam changing elements 5a and 5b fitted snugly within the bore of split sleeve 7 in the central area in such a way that the polarization-independent optical isolator is held between beam changing elements 5a and 5b. An optical connector using the adapter-type optical isolator 1 is simple in construction, permits simple assembly and adjustments, is small, allows for easy optical adjustments on individual optical parts, features high operational stability and can be incorporated into a wide variety of measuring instruments and communication equipment.

26 Claims, 14 Drawing Sheets

A    B

POLARIZATION INDEPENDENT OPTICAL ISOLATOR WITH INTEGRALLY ASSEMBLED BIREFRINGENT CRYSTAL ELEMENT AND FARADAY ROTATOR

This is a continuation of application Ser. No. 08/587,767 filed Dec. 21, 1995, now abandoned which application is hereby incorporated by reference in its entirety.

BACKGROUND OF THE INVENTION

This invention relates to an optical connector and, more particularly, to an optical connector incorporating a polarization-independent optical isolator to be provided between optical fibers in fiber optics communication systems and the like.

With the recent advances in optical communications that use semiconductor lasers as signal light sources, it has become possible to transmit signals at high speed and density exceeding several gigahertz. Among the various optical components used in such high-speed and density signal transmission is an optical isolator which prevents the reentrance of reflected light into semiconductor lasers.

Optical isolators are of two types, a polarization-dependent isolator which transmits only the light travelling in a specified direction of polarization and a polarization-independent isolator which transmits light in any direction of polarization. The second type of optical isolators are typically used in light amplifiers at repeaters in signal transmission systems and will be in great demand in the future.

FIG. 26 shows the construction of a typical example of the conventional polarization-independent optical isolator. Generally indicated by 410, the isolator comprises one Faraday rotator and three birefringent crystal plates.

In FIG. 26, the first to the third birefringent crystal plates are identified by 411, 412 and 413, respectively, and the Faraday rotator 414 is provided between the plates 411 and 412. A magnetic field parallel to the Z direction is applied to the Faraday rotator 414. The birefringent crystal plates 411, 412 and 413 are parallel plates prepared by polishing slices of a uniaxial crystal that have been cut in such a way that their C axis is at an angle with the surface. A ray of light incident normal to each of these parallel plates is separated into two components that are polarized in orthogonal crossed directions. The birefringent crystal plates 411, 412 and 413 have different thicknesses in the direction of light transmission and their ratio is $1:1/\sqrt{2}:1/\sqrt{2}$. The plate 413 is such that its C axis coincides with the C axis of the plate 412 if the latter is rotated through 90° about the Z axis. The Faraday rotator 414 is typically formed of a bismuth-substituted garnet and can rotate the direction of light polarization non-reciprocally through an angle of 45°. Shown by 415 is a coupling lens for coupling the light to an optical fiber 416 or 417.

For the purpose of the following discussion, the direction of light travel is assumed to be "forward" if it is launched from the birefringent crystal plate 411 and "backward" if it is launched from the plate 413. Thus, the forward incident ray of light is indicated by 410f and the backward incident ray of light is indicated by 410b. When the incident light is separated into two components, those in the forward direction are indicated by f1 and f2 whereas those in the backward direction are indicated by b1 and b2. The direction of light travel is represented by the arrow.

FIG. 27 shows how light travels through the optical isolator when it is seen from the birefringent crystal plate 411. A part (1) of FIG. 27 refers to the case of forward light propagation and a part (2) of FIG. 27 refers to the case of backward light propagation; A–E correspond to the respective positions A–E in FIG. 26; the dots represent the positions of respective light components and the arrows represent the directions of planes of polarization. The plane of polarization is assumed to rotate in "+" direction if it rotates clockwise.

The operating principle of the optical isolator will now be described with reference to FIGS. 26 and 27. If the C axis of the birefringent crystal plate 411 is directed upward (along the Y axis), forward signal light 410f launched from the coupling lens 415 to be incident on the plate 411 is separated into two components f1 and f2 in orthogonal crossed directions of polarization (see at B in FIG. 27(1)). With their relative positions remaining the same, the components f1 and f2 have the respective planes of polarization rotated through +45 degrees by the Faraday rotator 414 and then enter the birefringent crystal plate 412 (see at C in FIG. 27(1)). The plate 412 is such that its C axis coincides with the C axis of the birefringent crystal plate 411 if the latter is rotated through −45 degrees, so the component f1 is refracted as an extraordinary component whereas the component f2 which is an ordinary component is not diffracted but simply transmitted through the plate 412 (see at D in FIG. 27(1)). The birefringent crystal plate 413 is such that its C axis coincides with the C axis of the plate 412 if the latter is rotated through +90 degrees, so the component f2 is refracted as an extraordinary component whereas the component f1 which is an ordinary component is simply transmitted through the plate 413 (see at E in FIG. 27(1)). Thus, the two components of polarization are recombined at point E and coupled to the optical fiber 416 by means of the coupling lens 415.

The backward light 410b, as far as it travels to point C, behaves in essentially the same way as the forward light 410f, except that due to the non-reciprocity of the Faraday rotator 414, the incident light components b1 and b2 have their planes of polarization rotated through +45 degrees as seen in the forward direction before they are incident on the birefringent crystal plate 411 (see at B in FIG. 27(2)). As a result, the component b1 is refracted as an extraordinary component whereas the component b2 which is an ordinary component is simply transmitted through the plate 411 (see at A in FIG. 27(2)). Thus, the components b1 and b2 emerge from the birefringent crystal plate 411 in different positions than when the forward light was launched into the same plate 411 and, hence, they will not couple with the optical fiber 417, thereby insuring that the reflected light will be isolated from the semiconductor laser.

FIG. 28 shows the exterior appearance of a conventional polarization-independent optical isolator. The optical isolator generally indicated by 420 comprises an isolator portion 418 and a connector portion 419 at both ends. The isolator portion 418 has the components that are shown in FIG. 26 and which are adjusted and fixed within a case. The connectors 419 are connected to optical fibers in other transmission systems. The size of the optical isolator portion 18 may be about 7 mm in diameter and 45 mm long.

The conventional polarization-independent optical isolator comprising a plurality of birefringent polarizing plates and a single Faraday rotator has suffered from the following disadvantages.

(1) It contains many parts that need precise optical adjustments, so the number of steps involved in assembly is so great as to make it a cumbersome and time-consuming operation.

(2) When the optical isolator portion is to be coupled to optical fibers, the great number of its components increases the length of the space through which light propagates between fibers. In addition, the rays of light that entered in the forward direction will emerge at positions deviating from the axes of the incident rays; therefore, the positions that serve as guides for the coupling lenses and optical fibers at opposite ends cannot be uniquely determined and, hence, considerable labor is needed to achieve optical axial alignment.

(3) Coupling to other transmission systems is only accomplished by means of the connectors at opposite ends, so a large installation space is required to incorporate the optical isolator into a measuring instrument or communication equipment.

(4) The individual optical devices are provided normal to the optical fibers, so the reflected light from these optical devices will return to the optical fibers such as to deteriorate the system's reflection attenuation characteristics.

(5) If the optical isolator is to be provided on the exit side of an optical fiber amplifier, a separate wavelength filter operating over a narrow band of frequencies is necessary but then the construction of the amplifier becomes complicated.

SUMMARY OF THE INVENTION

The present invention has been accomplished under these circumstances of the prior art and has as an object providing an optical connector comprising two optical fiber holding ferrules and a tubular member into which said two ferrules are inserted from opposite ends and held in position, characterized in that said tubular member has provided therein a polarization-independent optical isolator device which is an integral assembly of a Faraday rotator and a birefringent crystal element.

Another object of the invention is to provide an optical connector comprising two core-flared fiber holding ferrules and a tubular member into which said two ferrules are inserted from opposite ends and held in position, characterized in that said tubular member has provided therein a polarization-independent optical isolator device which is an integral assembly of one or more Faraday rotators, two or more birefringent crystal plates and one or more half-wave plates.

Still another object of the invention is to provide an optical connector comprising two core-flared fiber holding ferrules and a tubular member into which said two ferrules are inserted from opposite ends and held in position, characterized in that said tubular member has provided therein a polarization-independent optical isolator device which is an integral assembly of one or more Faraday rotators, two or more birefringent crystal plates and one or more wavelength filters.

Yet another object of the invention is to provide an optical connector comprising two ferrules holding a fiber collimator prepared by fusion-splicing a graded-index fiber and a single-mode fiber, and a tubular member into which said two ferrules are inserted from opposite ends and held in position, characterized in that said tubular member has provided therein a polarization-independent optical isolator device which is an integral assembly of one or more Faraday rotators and two or more birefringent crystal plates.

Figure 27:
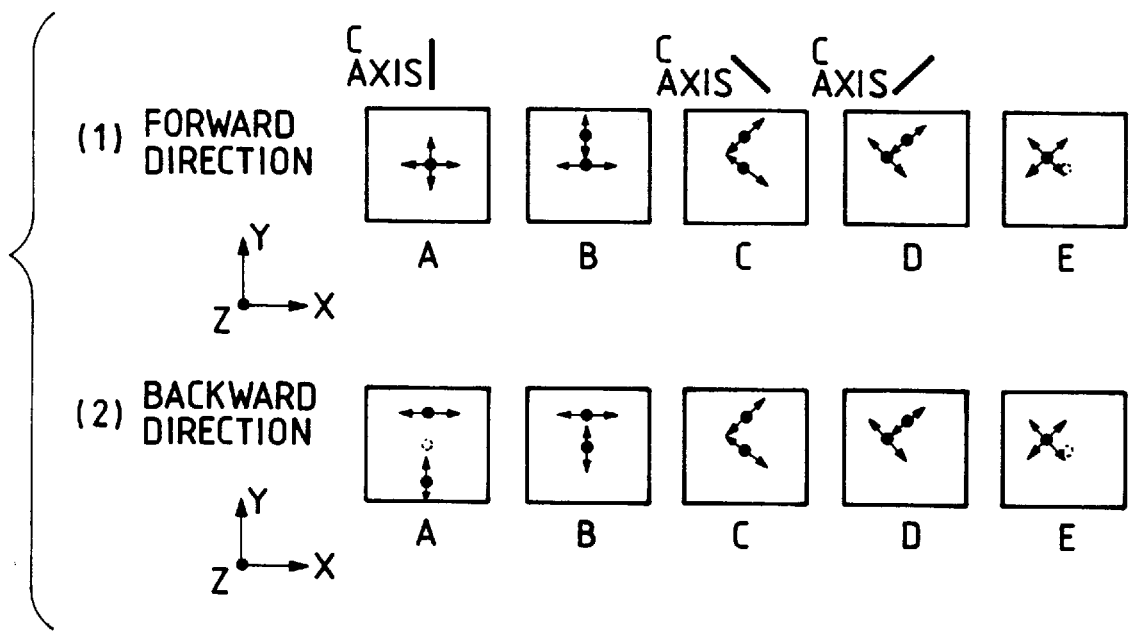
Figure 28:
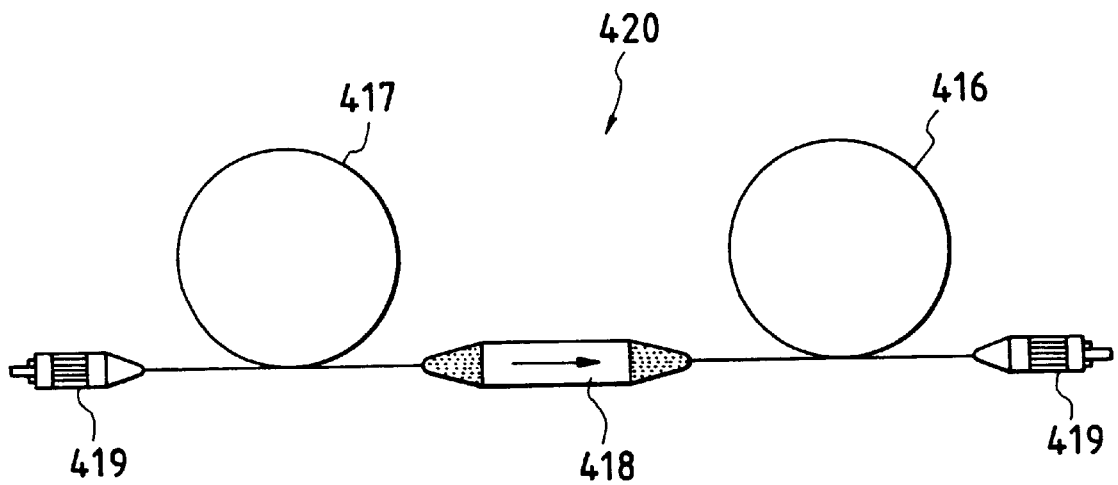
Figure 29A:
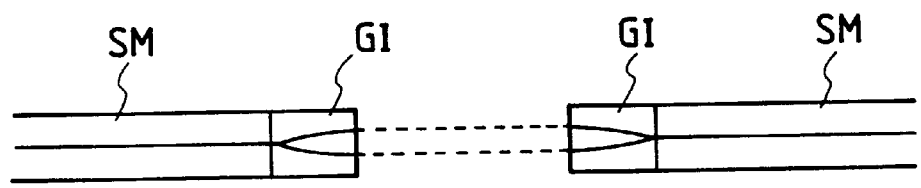
Figure 29B:
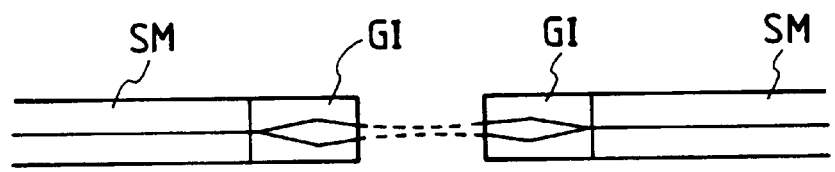

A part (1) of FIG. 27 illustrates the operating principle of the prior art polarization-independent optical isolator as it concerns the propagation of forward travelling light;

A part (2) of FIG. 27 concerns the propagation of backward travelling light;

FIG. 28 shows the exterior appearance of the prior art polarization-independent optical isolator; and FIG. 29 shows diagrammatically the fiber collimators for use in the optical connector of the invention.

DETAILED DESCRIPTION OF THE PREFERRED EMBODIMENTS

Figure 1A:
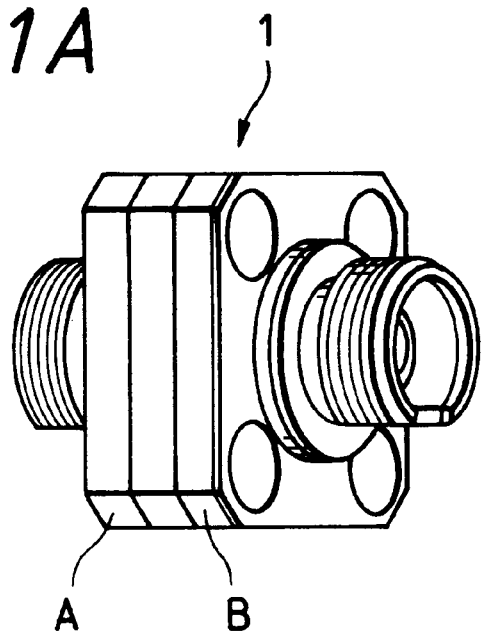
FIG. 1A is a perspective view showing a first embodiment of an adapter-type optical isolator for use in the optical connector of the invention.
Figure 1B:
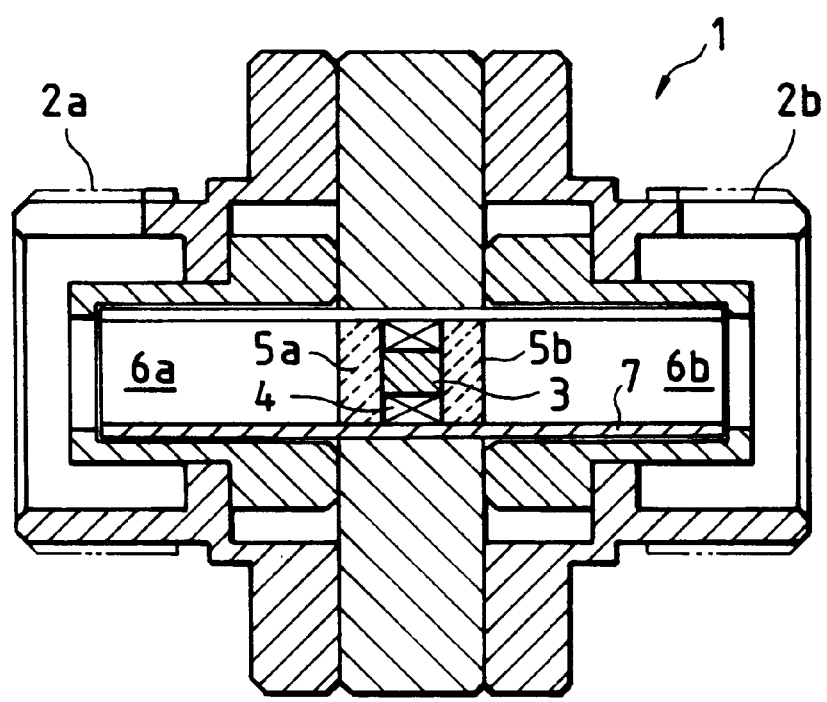
FIG. 1B is a section of FIG. 1A.
Figure 2:
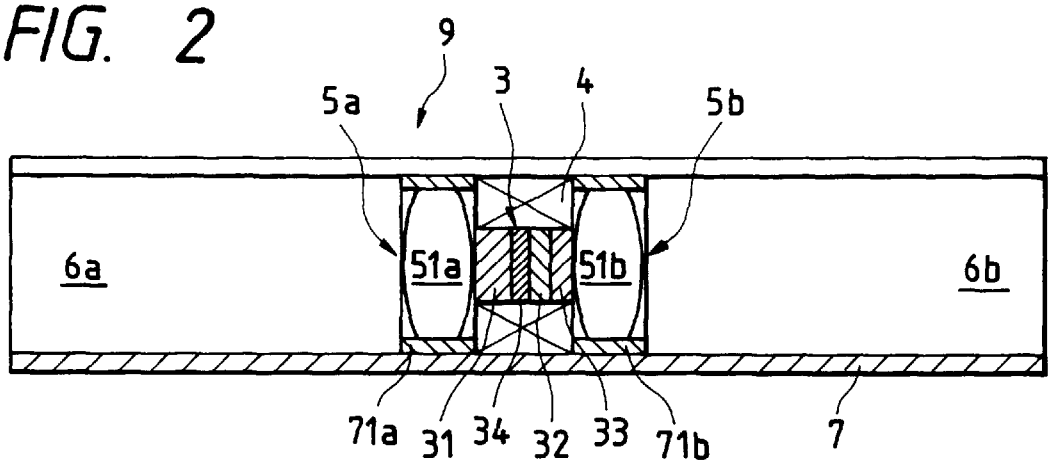
FIG. 2 is a sectional view showing an example of the isolator portion of the adapter-type optical isolator shown in FIG. 1B.
Figure 3:
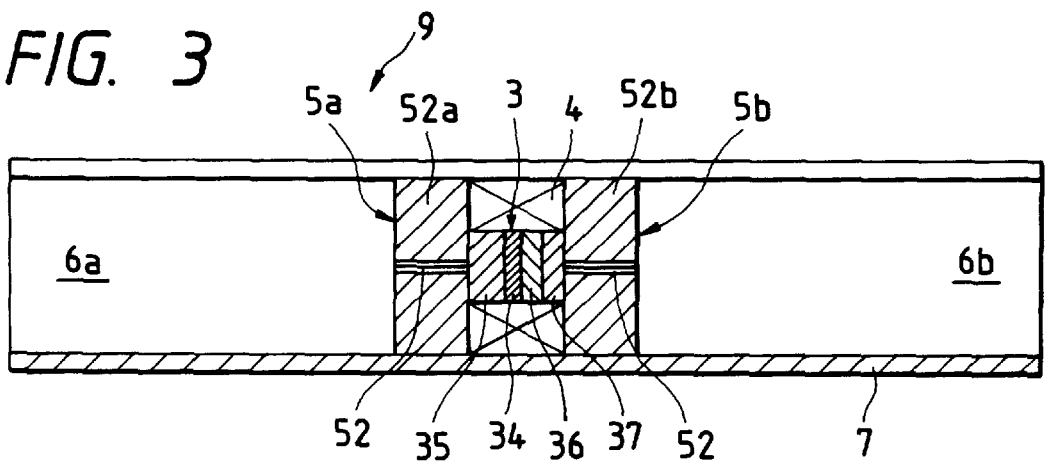
FIG. 3 is a sectional view showing another example of the isolator portion of the adapter-type optical isolator shown in FIG. 1B.

Various embodiments of the invention will now be described with reference to accompanying drawings. FIG. 1A is a perspective view showing a first embodiment of an adapter-type optical isolator for use in the optical connector of the invention and FIG. 1B is a section of FIG. 1A. FIGS. 2 and 3 are sectional views showing a first and a second example, respectively, of the isolator portion 9 of the adapter-type optical isolator shown in FIG. 1B. In FIGS. 1A, 1B, 2 and 3, like parts or components are identified by like numerals.

The adapter-type optical isolator generally indicated by 1 in FIGS. 1A and 1B comprises housings A and B which contain a split sleeve 7 as a tubular member. The portions indicated by 2a and 2b each an form external thread. An optical isolator device 3 is an integral assembly of a Faraday rotator and a birefringent element. A hollow cylindrical magnet 4 contains the Faraday rotator in such a way that the latter is given a saturation magnetic field parallel to the optical axis. The magnet 4 combines with the optical isolator device 3 to make a polarization-independent optical isolator which is held within the bore of the split sleeve 7. Beam changing elements 5a and 5b are held in position along the optical axis in such a way that ferrules as inserted into the optical isolator 1 through openings 6a and 6b at opposite ends of the isolator will contact the end faces of those beam changing elements. The term "beam changing elements" as used herein shall refer to those elements which are capable of changing the diameter or shape of the spot of a light beam issuing from an optical fiber.

The optical isolator device 3 and the beam changing elements 5a and 5b are processed with a sufficiently high precision in outside diameter to insure that they will be snugly fitted within the bore of the split sleeve 7. Hence, an optical communication system can be provided with a capability for optical isolation by merely connecting a conventional connector plug to both sides of the adapter-type optical isolator 1.

FIG. 2 shows a first example of the isolator portion 9 of the adapter-type optical isolator 1, in which the beam changing elements 5a and 5b are optical coupling lenses 51a and 51b, and the optical isolator device 3 has rutile polarizing plates 31, 32 and 33 combined integrally with a Faraday rotator 34. The optical isolator device 3 is provided within the magnet 4 to work as a polarization-independent optical isolator.

The optical isolator device 3 operates as a polarization-independent optical isolator by the same principle as the prior art optical isolator shown in FIGS. 31 and 32. To fabricate the optical isolator device 3, large substrates for the Faraday rotator and the rutile polarizer may be subjected to optical adjustments, bonded together with an optical adhesive and cut to a size equal to the inner diameter of the magnet 4; therefore, a number of optical isolator devices 3 can be easily fabricated. As a further advantage, the unitary assembly of the necessary elements shortens the space of light propagation, thereby reducing the connection loss.

The optical coupling lenses 51a and 51b are so designed that the light issuing from the optical fiber within the ferrule inserted from the side where the opening 6a is provided is effectively transmitted through the optical isolator device 3 to achieve low-loss coupling to the optical fiber within the ferrule inserted from the opposite side where the opening 6b is provided. Specifically, the optical coupling lenses 51a and 51b may be ball lenses, rod lenses, aspheric lenses, etc.

The split sleeve 7 is typically of such a size that it has an outside diameter of 3 mm and inside diameter of 2.5 mm and, hence, the magnet 4 and the optical coupling lenses 51a and 51b are desirably of 2.5 mm in diameter so that they can be snugly fitted in the interior of the split sleeve 7. In the example under consideration, the optical coupling lenses 51a and 51b are retained within hollow cylindrical holders 71a and 71b, respectively, that have an outside diameter of 2.5 mm. If a simpler construction is needed, not only the optical isolator device 3 but also the optical coupling lenses 51a and 51b may be held within the magnet 4 having an outside diameter of 2.5 mm.

According to the first example under consideration, the ferrules inserted into the adapter-type optical isolator 1 are snugly fitted within the bore of the split sleeve 7 and, in addition, the polarization-independent optical isolator composed of the optical isolator device 3 and the magnet 4, as well as the beam changing elements 5a and 5b are likewise fitted snugly within the bore of the split sleeve 7. Because of this design feature, the individual parts and components are optically aligned with one another and therefore need not be precisely adjusted for assembly and hence the adapter-type optical isolator 1 can be fabricated in a very simple way.

FIG. 3 shows a second example of the isolator portion 9 of the adapter-type optical isolator 1, in which the beam changing elements 5a and 5b are short ferrules 52a and 52b which each hold a core-flared fiber 52. The axial length of each ferrule is set to be greater than the length L of the flared core portion of the fiber 52 (see FIG. 4). The ferrules 52a and 52b are PC or obliquely polished at both end faces and placed on opposite sides of the optical isolator device 3 in such a way that the flared core portion of the fiber 52 will face the device 3.

The optical isolator device 3 is of such a design that structurally birefringent elements 35, 36 and 37 are combined integrally with the Faraday rotator 34.

Figure 4:
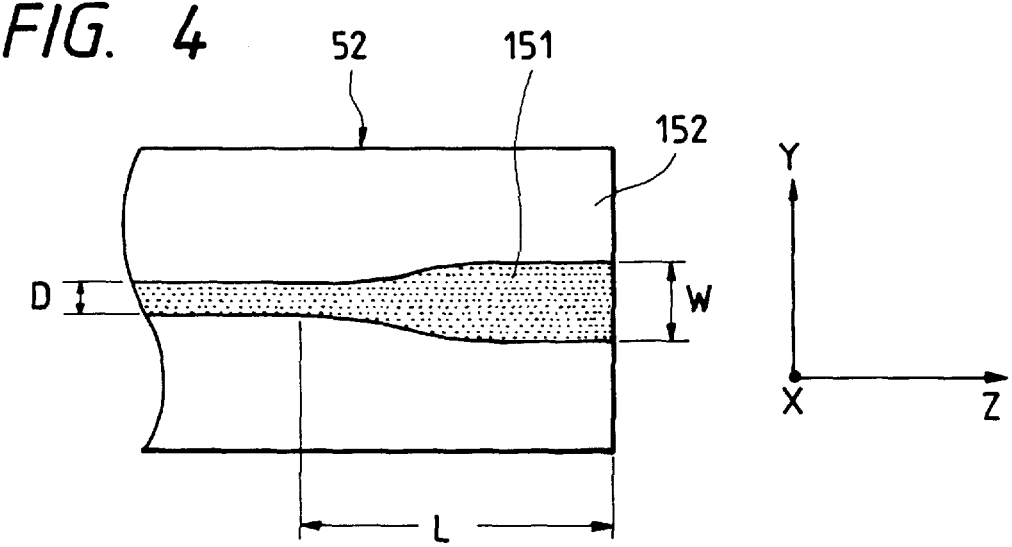
FIG. 4 is a longitudinal section of a core-flared fiber.

FIG. 4 is a longitudinal section of the core-flared fiber 52 consisting of a core 151 and a cladding 152. The unflared portion of the core has a diameter D and the flared portion has a diameter of W. As shown, the core diameter D of an ordinary optical fiber is flared to terminate in a diameter W which is three to four times the diameter of the transmission path. A flared core can be realized by thermally diffusing the dopant in the core of the optical fiber and the flared core portion has a smaller refractive index than the unflared portion.

Figure 5A:
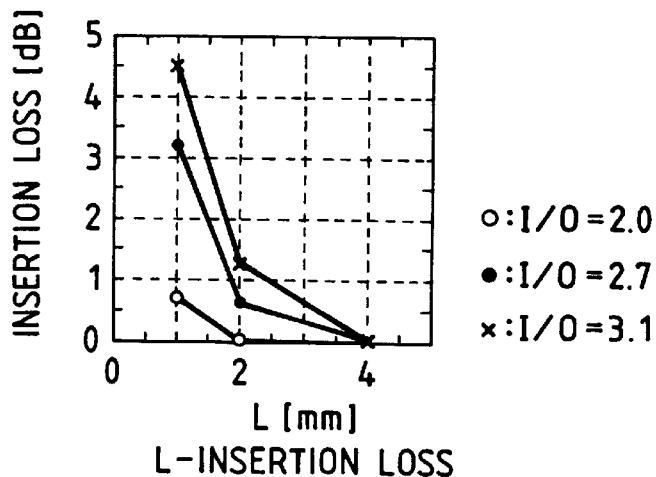
FIG. 5A is a characteristic diagram of the coreflared fiber.
Figure 5B:
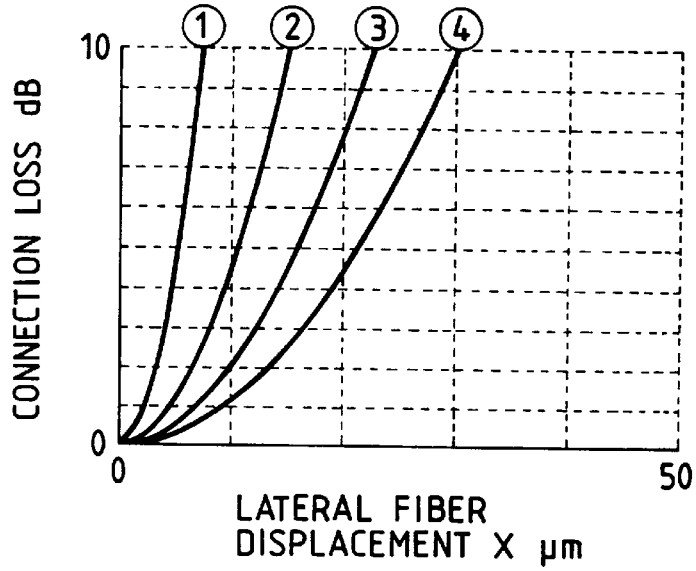
FIG. 5B is another characteristic diagram of the core-flared fiber.
Figure 5C:
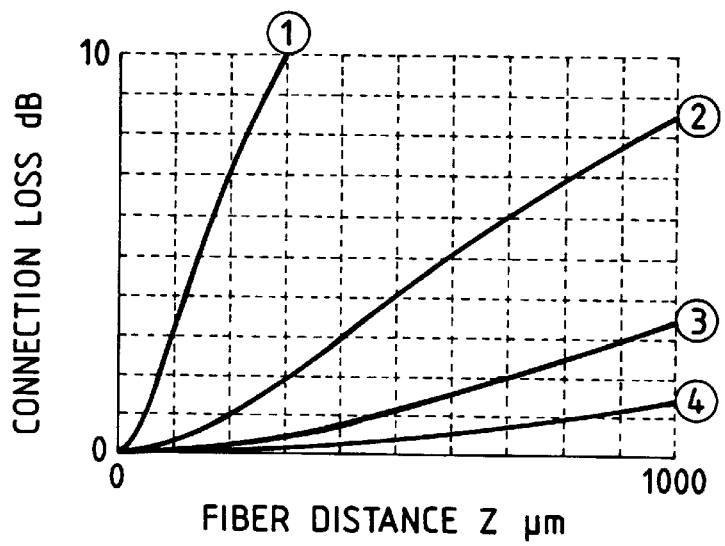
FIG. 5C is another characteristic diagram of the core-flared fiber.

The core-flared fiber characteristics were calculated for the case of $\lambda=1.55$ $\mu$m and the data obtained are shown in FIGS. 5A, 5B and 5C.

FIG. 5A shows the results of calculation on the relationship between the length L of the flared core portion of the fiber and excess loss, with the core flare ratio (W/D) being varied at 2, 2.7 and 3.1. Obviously, the excess loss of the core-flared fiber decreased with the increasing L and, given the same value of L, the excess loss increased with the increasing core flare ratio. Therefore, the core flare ratio and the length of the flared portion must be determined such that the excess loss is reasonably small.

FIG. 5B shows the results of calculation on the relationship between lateral fiber displacement X and connection loss, with the core flare ratio being varied at 1, 2, 3 and 4, when two core-flared fibers were directly coupled (fiber distance Z=0 μm) in such a way that the flared portion of one fiber faced the flared portion of the other. Obviously, the connection loss decreased with the increasing core diameter, resulting in an improvement of the tolerance characteristic of the lateral fiber displacement. Thus, the use of core-flared fibers insures that even if there is a small amount of misalignment between the axes of the opposed core-flared fibers the connection loss due to such a lateral fiber displacement can be sufficiently reduced, thereby eliminating the need for cumbersome adjustments.

FIG. 5C shows the results of calculation on the relationship between fiber distance Z and connection loss, with the core flare ratio being varied at 1, 2, 3 and 4, when two core-flared fibers were directly coupled (Z=0 μm) in such a way that the flared portion of one fiber faced the flared portion of the other. Obviously, the connection loss decreased with the increasing core diameter, resulting in an improvement of the tolerance characteristic of the fiber distance Z. Thus, the use of core-flared fibers offers the advantage that the connection loss due to the distance between fibers can be reasonably reduced even if an optical isolator device is inserted between the fibers. As another advantage, the plug-type optical isolator can be fabricated without using lenses and, hence, at a lower cost.

Figure 6:
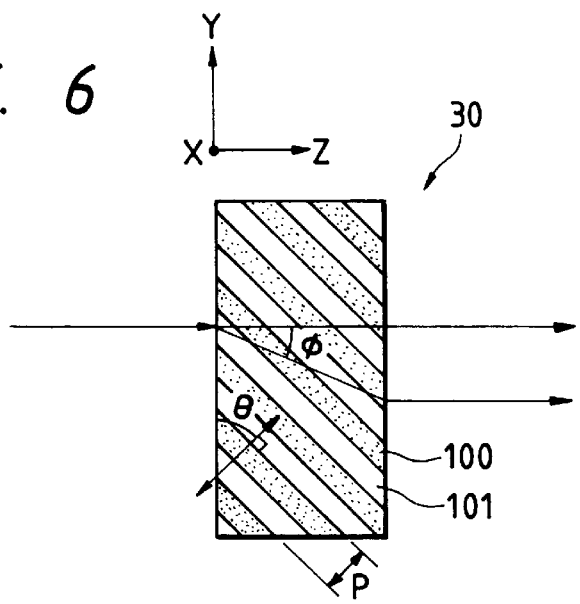
FIG. 6 is a section of a structurally birefringent element.

FIG. 6 is a sectional view showing schematically the structurally birefringent element. The structurally birefringent element generally indicated by 30 consists of two dielectric media 100 and 101 having different refractive indices that are alternately arranged at an angle θ with the X-Y plane of an end face of the element.

In order to make the structurally birefringent element, the pitch P of the arrangement of the layers of two media 100 and 101 must be adequately smaller than the wavelength of light. The multi-layered structure of this design exhibits as effective birefringence as a negative uniaxial crystal having the axis oriented at angle θ.

As the refractive index difference between the two media 100 and 101 is increased, the structurally birefringent element 30 will exhibit a greater degree of birefringence that cannot be achieved by conventional crystals and the separation angle of polarization φ will increase accordingly. Therefore, the use of the structurally birefringent elements contributes to a smaller thickness of the optical isolator device 3 and the resulting decrease in the length of the space for light propagation will eventually contribute to an even smaller connection loss.

Take, for example, the case where the structurally birefringent element uses $SiO_2$ ($n_o$=1.45) as medium 100 and Si ($n_1$=3.52) as medium 101, with e being set at 54.8°. When, the separation angle of polarization φ is 19.7°, which is more than three times the separation angle of polarization that can be achieved by a rutile crystal plate.

If the structurally birefringent element 30 and the core-flared fiber 52 (X=30 μm) are assembled into the isolator portion 9 shown in FIG. 3, the optical isolator device 3 is as thin as about 550 μm and it is shown by calculation that the optical isolator has the following satisfactory characteristics: loss in forward direction, 0.3 dB; isolation, 40 dB.

In the embodiments and examples shown in FIGS. 1A–6, a split sleeve is used as a tubular member but this is not the sole case of the invention and the tubular member may be formed of other kinds of sleeves.

Figure 7:
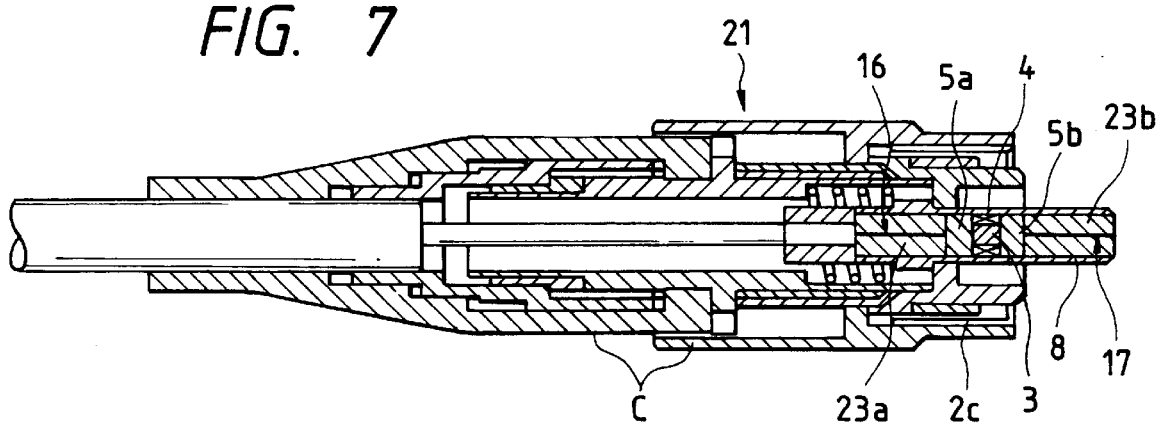
FIG. 7 is a sectional view showing first embodiment of a plug-type optical isolator for use in the optical connector of the invention.
Figure 8:
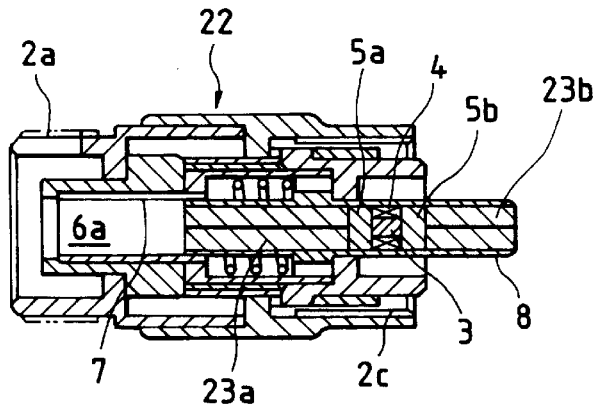
FIG. 8 is a sectional view showing an embodiment of an adapter-plug type optical isolator for use in the optical connector of the invention.
Figure 9:
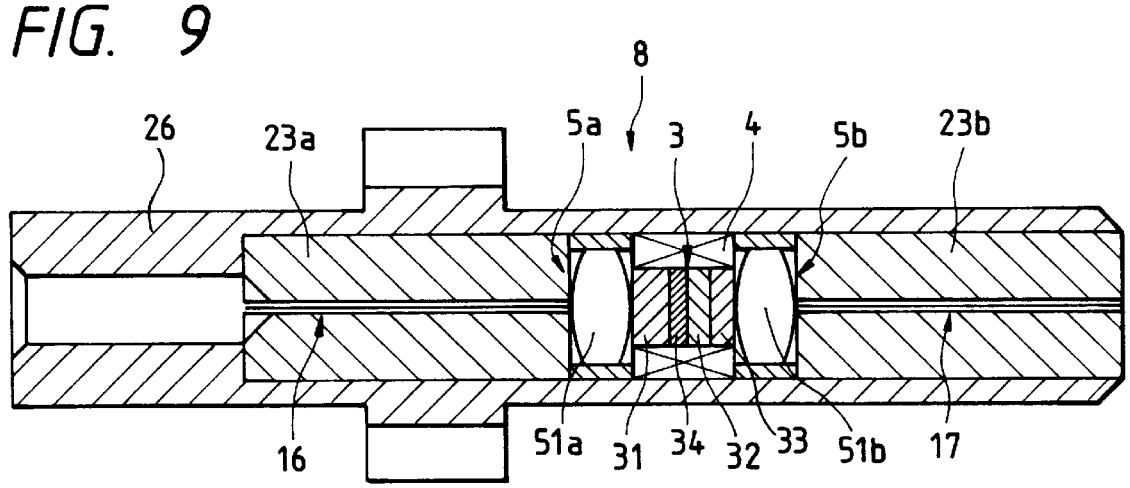
FIG. 9 is a sectional view showing an example of the isolator portion of each of the plug-type optical isolator shown in FIG. 7 and the adapter-plug type optical isolator shown in FIG. 8.
Figure 10:
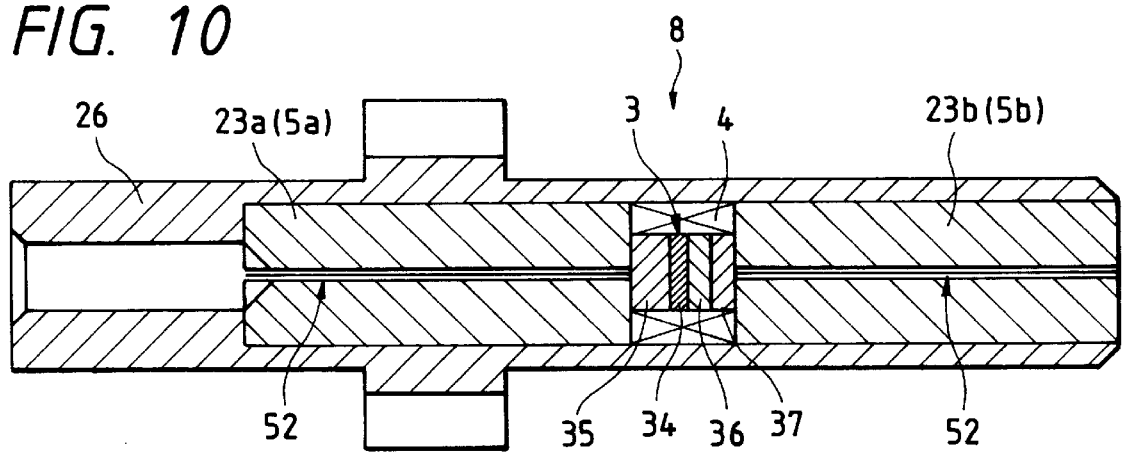
FIG. 10 is a sectional view showing another example of the isolator portion of each of the plug-type optical isolator shown in FIG. 7 and the adapter-plug type optical isolator shown in FIG. 8.

FIG. 7 is a sectional view showing an embodiment of a plug-type optical isolator 21 for use in the optical connector of the invention. FIG. 8 is a sectional view showing an embodiment of an adapter-plug type optical isolator 22 for use in the optical connector of the invention. An adapter-plug device is such that one end of it functions as an adapter while the other functions as a plug. FIGS. 9 and 10 show a first and a second example of the isolator portion of the plug-type optical isolator 21 (FIG. 7) or the adapter-plug type optical isolator 22 (FIG. 8). The isolator portion of these examples is formed as a capillary ferrule. In FIGS. 7–10, like parts or components are identified by like numerals.

The plug-type optical isolator shown in FIG. 7 has a capillary ferrule 8 contained in a plug housing C, with an internal thread 2c being provided in such a way that when the isolator is connected to an adapter, the capillary ferrule 8 is inserted into the sleeve in the adapter and fixed in position by means of engagement between the external thread on the adapter and the internal thread 2c. The capillary ferrule 8 holds in it capillaries 23a and 23b, a polarization-independent optical isolator comprising a magnet 4 and an optical isolator device 3, and beam changing elements 5a and 5b. The polarization-independent optical isolator and the beam changing elements, details of which will be described just below with reference to FIGS. 9 and 10, are essentially the same as the already described polarization-independent optical isolator and the beam changing elements which are components of the isolator portion 9. The capillaries 23a and 23b respectively have optical fibers 16 and 17 inserted through orifices.

The adapter-plug type optical isolator 22 shown in FIG. 8 is the same as the plug-type optical isolator 21 shown in FIG. 7 except that it has a structure for connection to an adapter provided at an end through the split sleeve 7. It has a structure for connection to a plug provided at the other end, which is structurally the same as the connecting portion of the plug-type optical isolator shown in FIG. 7. As shown, said structure for connection to a plug has a capillary ferrule 8 for holding a polarization-independent optical isolator.

FIG. 9 is a sectional view showing a first example of the capillary ferrule 8, or the isolator portion, of the plug-type optical isolator 21 (FIG. 7) or the adapter-plug type optical isolator 22 (FIG. 8). As shown, the capillary ferrule 8 contains capillaries 23a and 23b, beam changing elements 5a and 5b, and a polarization-independent optical isolator composed of a magnet 4 and an optical isolator device 3. The capillary ferrule 8 has a flange 26 which is the tubular member of the invention.

The beam changing elements 5a and 5b and the polarization-independent optical isolator according to the first example under consideration are essentially the same in structure as those already described above which are snugly fitted within the bore of the split sleeve 7 shown in FIG. 2. The beam changing elements 5a and 5b are optical coupling lenses 51a and 51b. The polarization-independent optical isolator has an optical isolator device 3 provided within a hollow cylindrical magnet 4, and the optical isolator device 3 comprises rutile polarizing plates 31, 32 and 33 which are combined integrally with a Faraday rotator 34. The capillaries 23a and 23b also have conventional optical fibers 16 and 17 inserted through the respective orifices.

FIG. 10 is a sectional view showing a second example of the capillary ferrule 8, or the isolator portion. The polarization-independent optical isolator and the beam changing elements in this example are structurally essentially the same as those already described above which are snugly fitted within the bore of the split sleeve 7 shown in FIG. 3. The polarization-independent optical isolator has an optical isolator device 3 provided within a hollow cylindrical magnet 4 and the optical isolator device 3 comprises structurally birefringent elements 35, 36 and 37 which are combined integrally with a Faraday rotator 34. Capillaries 23a and 23b have core-flared fibers 52a and 52b inserted therethrough and function as beam changing elements 5a and 5b. The capillaries are positioned on opposite sides of the optical isolator device 3, with the flared core portion of the fiber facing the latter. Shown by 26 is a flange.

The operating principles and other features of the polarization-independent optical isolator and the beam changing elements to be incorporated in the flange 26 of each of the capillary ferrules 8 shown in FIGS. 9 and 10 are essentially the same as those already described with reference to the isolator portion 9 shown in FIGS. 2 and 3 and, hence, will not be described here again.

Figure 11:
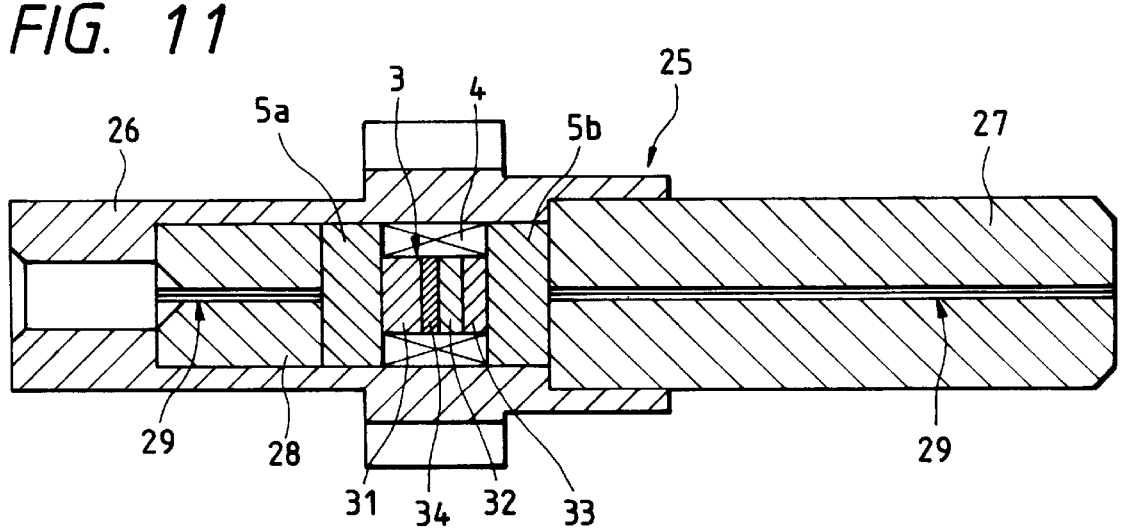
FIG. 11 is a sectional view showing another example of the isolator portion of the optical connector of the invention.

FIG. 11 is a sectional view showing another example of the isolator portion of the optical connector of the invention. The isolator portion (ferrule) generally indicated by 25 comprises a metal flange 26 holding a ferrule 27 at the distal end, which is a monolithic structure molded from ceramics, typically zirconia. The metal flange 26 holds not only a capillary 28 but also a polarization-independent optical isolator that consists of the optical isolator device 3 and the magnet 4 already described above and which is sandwiched between beam changing elements 5a and 5b. Both the zirconia ferrule 27 and the capillary 28 have an optical fiber 29 inserted through an orifice. In the example under consideration, the optical isolator device 3 comprises rutile polarizing plates 31, 32 and 33 which are combined integrally with a Faraday rotator 34. If desired, the optical isolator device 3 may comprise an integral assembly of structurally birefringent elements and the Faraday rotator as in the example shown in FIG. 3. Similarly, the beam changing elements 5a and 5b may be realized by using various elements such as optical coupling lenses, core-flared fibers, etc. If core-flared fibers are to be used, the optical fiber 29 to be inserted into both the zirconia ferrule 27 and the capillary 28 may be flared in core diameter so that the zirconia ferrule 27 and the capillary 28 will themselves function as beam changing elements. This design has the advantage of reducing not only the number of parts to be used but also the connection loss.

Figure 12:
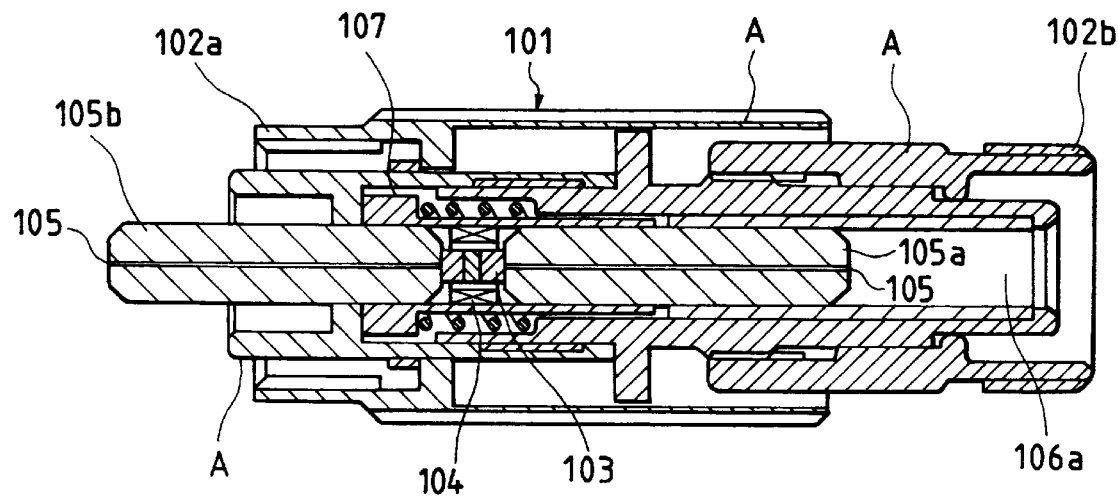
FIG. 12 is a sectional view showing a plug-type optical isolator for use in another embodiment of the optical connector of the invention.
Figure 13:
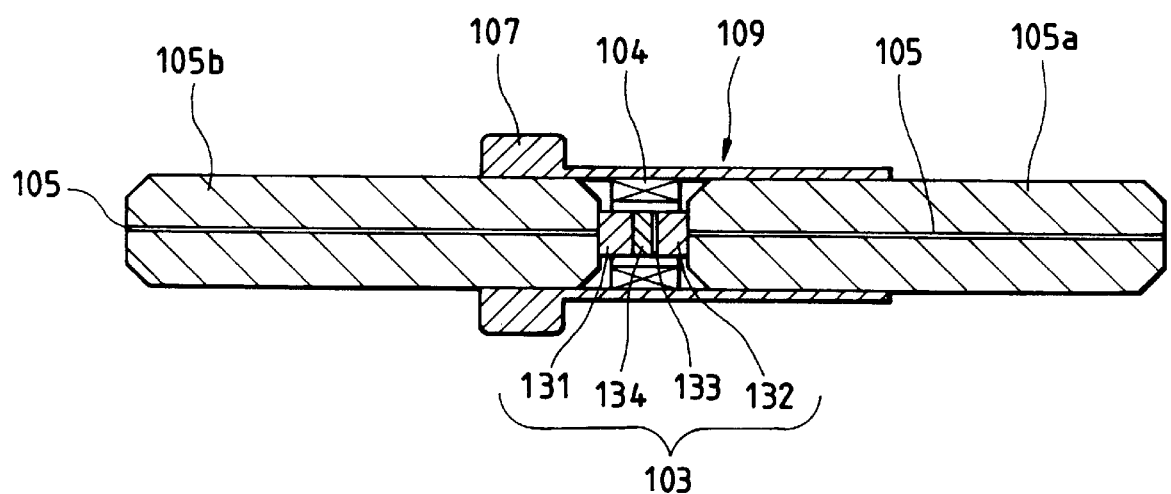
FIG. 13 is a sectional view showing the isolator portion of the plug-type optical isolator shown in FIG. 12.

FIG. 12 is a sectional view showing a plug-type optical isolator according to another embodiment of the optical connector of the invention. FIG. 13 is a sectional view of the isolator portion 109 of the plug-type optical isolator generally indicated by 101 in FIG. 12. In FIGS. 12 and 13, like parts or components are identified by like numerals. While details will be given just below, an optical isolator device of the embodiment under consideration consists essentially of a Faraday rotator, birefringent crystal plates and a half-wave plate.

The plug-type optical isolator 101 comprises a housing A which contains a flange 107. The portions indicated by 102a and 102b form an internal thread and an external thread, respectively. An optical isolator device 103 is an integral assembly of a Faraday rotator, birefringent crystal plates and a half-wave plate. A hollow cylindrical magnet 104 contains the Faraday rotator in such a way that the latter is given a saturation magnetic field parallel to the optical axis. The magnet 104 combines with the optical isolator device 103 to make a polarization-independent optical isolator, which is held within the bore of the flange 107. Ferrules 105a and 105b each hold a core-flared fiber 105 in an orifice. These ferrules are held in position along the optical axis in such a way that when they are inserted into the plug-type optical isolator 101 through an opening 106a at an end of that isolator, they will contact an end face of that isolator. Ferrule 105b is such that its axial length provides a certain projection beyond the plug-type optical isolator 101 that complies with a specification. In the embodiment under consideration, the flange 107 serves as the tubular member of the invention.

Ferrules 105a and 105b are snugly fitted in the flange 107 and fixed thereto by bonding with an adhesive. To this end, the ferrules are processed with a reasonable precision in outside diameter. Hence, an optical communication system can be provided with a capability for optical isolation by merely connecting a conventional connector plug to the plug-type optical isolator 101 through the opening 106a while connecting the ferrule 105b to an adapter.

FIG. 13 is a sectional view showing the isolator portion 109 of the plug-type optical isolator 101 from which the housing A shown in FIG. 12 has been omitted. The optical isolator device 103 is an integral assembly of birefringent crystal plates 131 and 132, a half-wave plate 133 and a Faraday rotator 134. The optical isolator device 103 is provided within the magnet 104 to work as a polarization-independent optical isolator.

To fabricate the optical isolator device 103 which works as a polarization-independent optical isolator, large substrates for the Faraday rotator, birefringent crystal plates and the half-wave plate may be subjected to optical adjustments, bonded together with an optical adhesive and cut to a size in which the respective components can be inserted into the magnet 104; thus, a number of optical isolator devices 103 can be easily fabricated. As a further advantage, the use of the half-wave plate contributes to a reduction in the overall device thickness and the unitary assembly of the necessary elements shortens the space of light propagation, thereby reducing the connection loss.

Consider, for example, the case where the Faraday rotator 134 is made of a bismuth-substituted garnet, the birefringent crystal plates 131 and 132 are rutile crystal plates and the half-wave plate 133 is a quartz plate, with all these components being assembled into an integral unit. The resulting optical isolator device 103 has an effective thickness of about 700 $\mu$m which is satisfactory for practical purposes.

Ferrules 105a and 105b which each hold the coreflared fiber 105 have their axial length set to be greater than the length L of the flared core portion of the fiber 105. The ferrules 105a and 105b are PC or obliquely polished at both end faces and placed on opposite sides of the optical isolator device 103 in such a way that the flared core portion of the fiber 105 will face the device 103.

The flange 107 has preferably such an inside diameter that the magnet 104 and the ferrules 105a and 105b can be snugly fitted in the interior of the flange 107 and it is also preferred that the ferrules 105a and 105b are fixed to the flange 107 by bonding with an adhesive.

According to the example just described above, the polarization-independent optical isolator composed of the optical isolator device 103 and the magnet 104, as well as the ferrules 105a and 105b each holding the core-flared fiber 105 in orifices are snugly fitted within the bore of the flange 107. Because of this design feature, the individual parts and components need not be precisely adjusted for assembly and, hence, the plug-type optical isolator 101 can be fabricated in a very simple way.

If an optical isolator device having an effective thickness of 700 μm and core-flared fibers having a core diameter (W) of 40 μm are assembled into the isolator portion 109 shown in FIG. 13, it is shown by calculation that the optical isolator has the following satisfactory characteristics: insertion loss, 1.2 dB; isolation, 40 dB.

Figure 14:
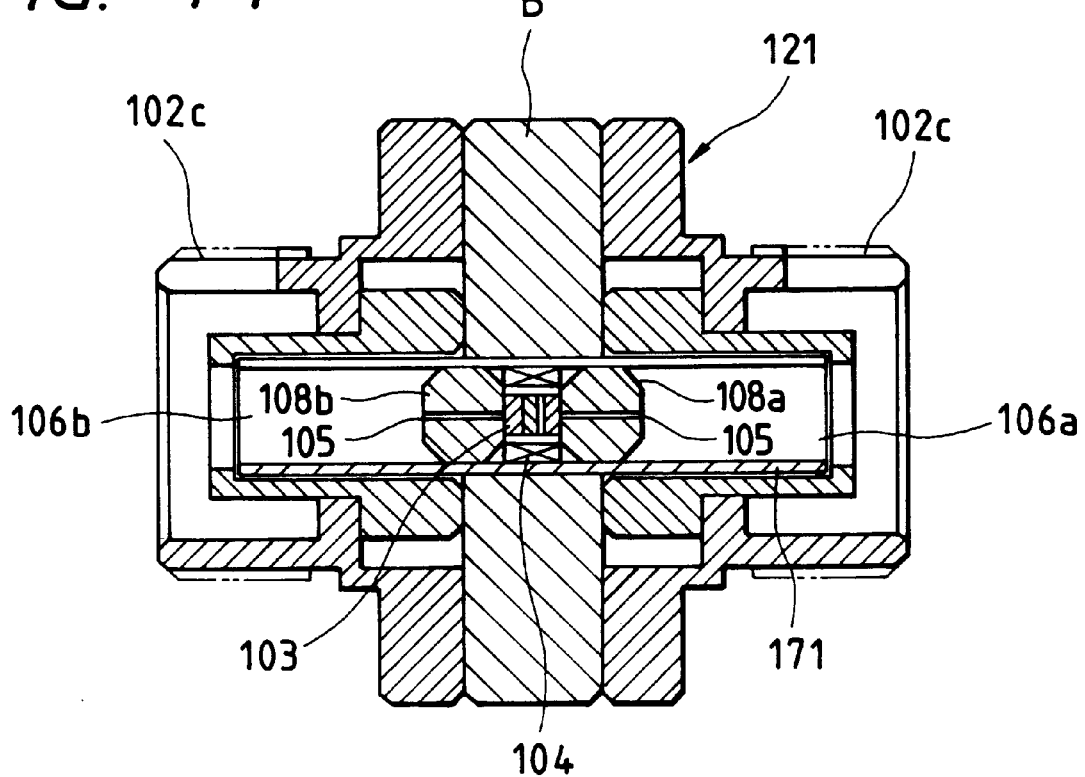
FIG. 14 is a sectional view showing an adaptertype optical isolator for use in still another embodiment of the optical connector of the invention.
Figure 15:
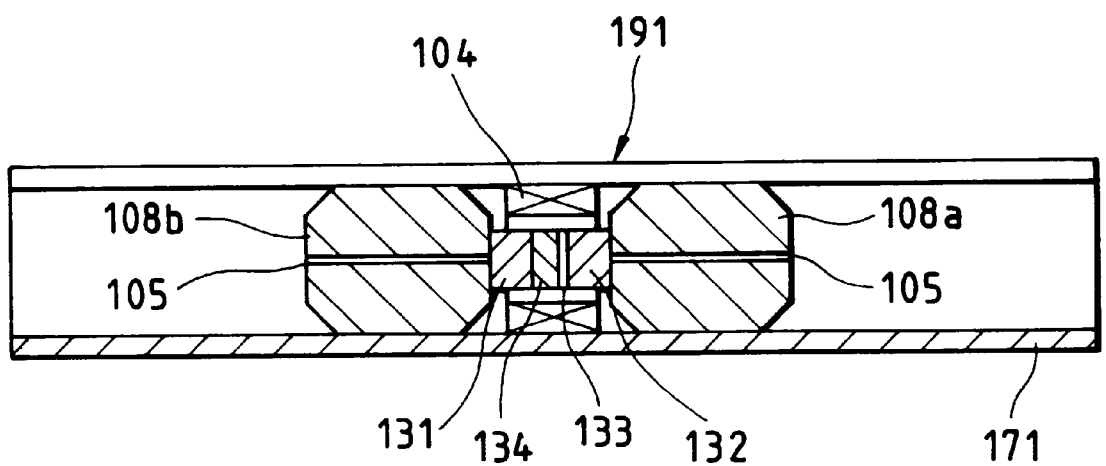
FIG. 15 is a sectional view showing the isolator portion of the adapter-type optical isolator shown in FIG. 14.

FIG. 14 is a sectional view showing an adaptertype optical isolator according to yet another embodiment of the optical connector of the invention. FIG. 15 is a sectional view of the isolator portion 191 of the adapter-type optical isolator generally indicated by 121 in FIG. 14.

The adapter-type optical isolator 121 shown in FIG. 14 comprises an adapter housing B containing a split sleeve 181. The portions indicated by 102c form external threads. Ferrules 108a and 108b each hold a core-flared fiber 105 in an orifice. The ferrules are held in position along the optical axis in such a way that when they are inserted into the adapter-type optical isolator 121 through openings 106a and 106b, they will contact the end faces of the polarization-independent optical isolator. While details of the polarization-independent optical isolator and core-flared fibers 105 in the isolator portion 191 will be given below with reference to FIG. 15, it should briefly be mentioned here that they are essentially the same as the polarization-independent optical isolator and the coreflared fibers that compose the isolator portion 109 shown in FIG. 13. It should also be noted that in the embodiment under consideration, the split sleeve 171 serves as the tubular member of the invention.

FIG. 15 is a sectional view showing an example of the isolator portion 191 of the adapter-type optical isolator 121. As shown, the isolator portion 191 is of such a structure that the polarization-independent optical isolator which is composed of a magnet 104 and an optical isolator device 103 and the ferrules 108a and 108b each holding the core-flared fiber 105 in the orifice are held within the split sleeve 171. The polarization-independent optical isolator has the optical isolator device 103 provided within the hollow cylindrical magnet 104 and the optical isolator device 103 is an integral assembly of a Faraday rotator 134, birefringent crystal plates 131 and 132 and a half-wave plate 133. The ferrules 108a and 108b have core-flared fibers 105 inserted therethrough and are positioned on opposite sides of the optical isolator device 103 in such a way that the flared core portion of each fiber 105 faces the device 103.

According to the example just described above, the polarization-independent optical isolator composed of the optical isolator device 103 and the magnet 104, as well as the ferrules 108a and 108b each holding the core-flared fiber 105 in the orifice are snugly fitted and secured within the bore of the split sleeve 171. Because of this design feature, the individual parts and components need not be precisely adjusted for assembly and, hence, the adapter-type optical isolator 121 can be fabricated in a very simple way.

In the embodiment and example shown in FIGS. 14 and 15, a split sleeve is used as the tubular member but this is not the sole case of the invention and a precision sleeve can also be used to provide the same result.

In the embodiments and examples, the fibers 105 held within the orifices in ferrules 105 and 105b, or ferrules 108a and 108b may be designed as the combination of graded-index fiber and a single-mode fiber to construct a fiber collimator.

The fiber collimator fabricated by connecting a graded-index fiber (GI) to a single-mode (SM) fiber will now be described with reference to FIG. 29. For the sake of convenience in explanation, the ferrules and the optical isolator device are omitted from FIG. 29. The GI fiber is spliced to the tip of the SM fiber by fusion or some other suitable technique and the connected fibers are fixed within each ferrule. The GI fiber contributes to increase the diameter of the mode field in the SM fiber and by insuring a proper match for the resulting beam change between opposed fibers, a great latitude can be provided in the tolerance against axial and lateral displacements. If the length of the GI fiber is set to be equal to a pitch wavelength) of ¼+n/2 (n=0, 1, 2, . . . ), a parallel beam is provided for optical coupling (see a part (a) of FIG. 29). If the GI fiber is set to be longer than the ¼pitch (wavelength), a beam waist is provided for optical coupling (a part (b) of FIG. 29); in this case, the collimator is designed in such a way that a beam waist is positioned on the center line through the opposed fibers. Thus, by connecting the GI fiber to the tip of the SM fiber, a device equivalent to a fiber collimator can be realized and low connection loss can be assured even if an optical isolator device is inserted between GI fibers.

It should be noted that the concept of a fiber collimator is also applicable to the embodiments to be described below.

Figure 16:
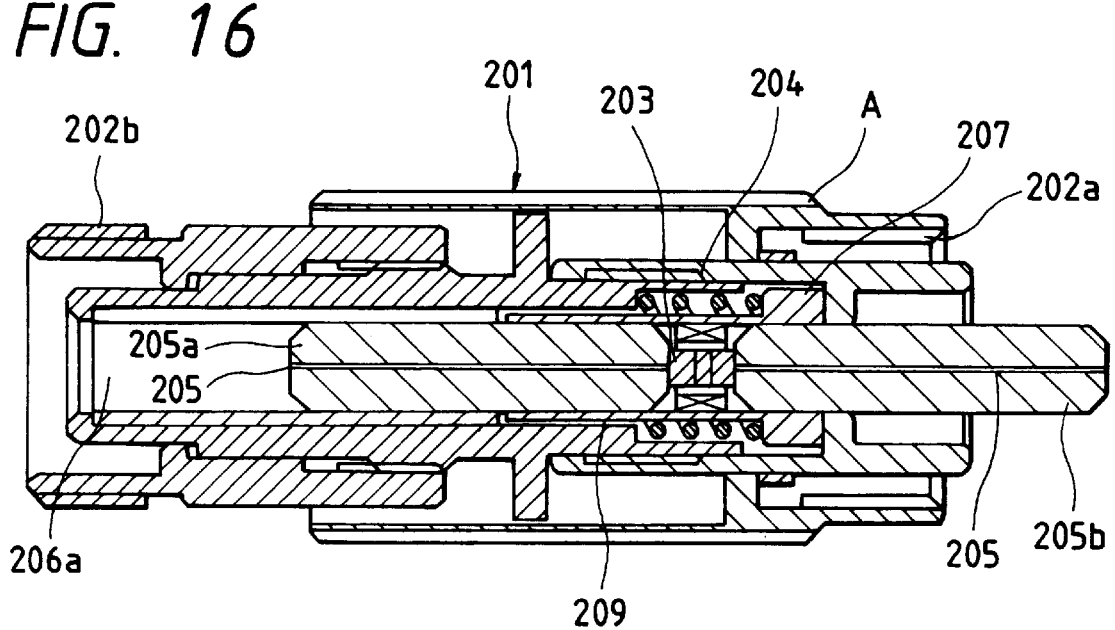
FIG. 16 is a sectional view showing a plug-type optical isolator for use in yet another embodiment of the optical connector of the invention.
Figure 17:
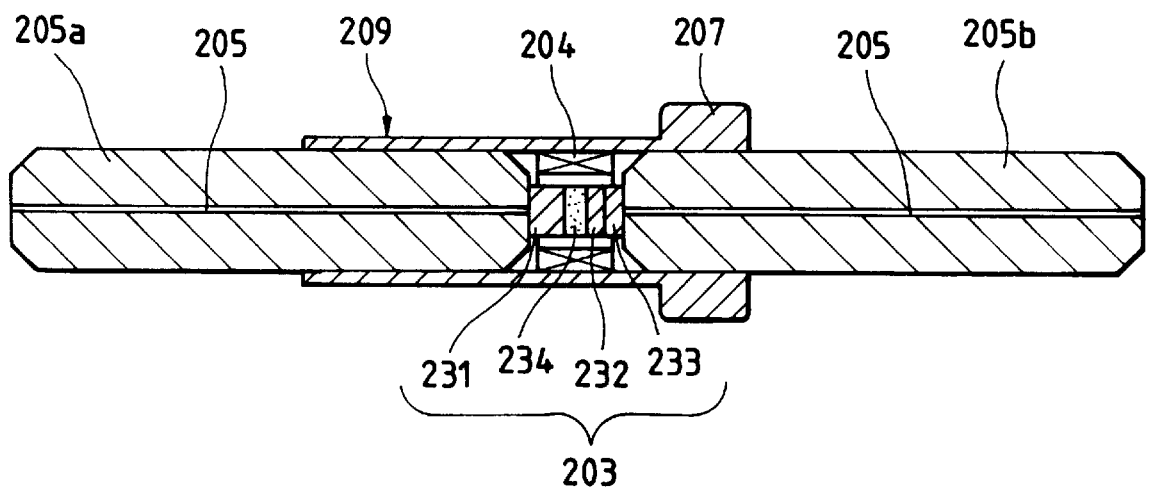
FIG. 17 is a sectional view showing the isolator portion of the plug-type optical isolator shown in FIG. 16.

FIG. 16 is a sectional view showing a plug-type optical isolator according to yet another embodiment of the optical connector of the invention. FIG. 17 is a sectional view of the isolator portion 209 of the plug-type optical isolator generally indicated by 201 in FIG. 16. In FIGS. 16 and 17, like parts or components are identified by like numerals.

The plug-type optical isolator 201 shown in FIG. 16 comprises a housing A which contains a flange 207. The portions indicated by 202a and 202b form an internal thread and an external thread, respectively. An optical isolator 203 is an integral assembly of a Faraday rotator and birefringent crystal plates. A hollow cylindrical magnet 204 contains the Faraday rotator in such a way that the latter is given a saturation magnetic field. The magnet 204 combines with the optical isolator device 203 to make a polarization-independent optical isolator which is held within the bore of the flange 207. Ferrules 205a and 205b each hold a core-flared fiber 205 in an orifice. These ferrules are held in position along the optical axis in such a way that when they are inserted into the plug-type optical isolator 201 through an opening 206a at an end of that isolator, they will contact an end face of that isolator. Ferrule 205b is such that its axial length provides a certain projection beyond the plug-type optical isolator 201 that complies with a specification. In the embodiment under consideration, the flange 207 serves as the tubular member of the invention.

Ferrules 205a and 205b are snugly fitted in the flange 207 and fixed thereto by bonding with an adhesive. To this end, the ferrules are processed with a reasonable precision in outside diameter. Hence, an optical communication system can be provided with a capability for optical isolation by merely connecting a conventional connector plug to the plug-type optical isolator 201 through the opening 206a while connecting the ferrule 205b to an adapter.

FIG. 17 is a sectional view showing the isolator portion 209 of the plug-type optical isolator 201 from which the housing A shown in FIG. 16 has been omitted. The optical isolator device 203 is an integral assembly of birefringent crystal plates 231, 232 and 233 and a Faraday rotator 234. The individual elements (birefringent crystal plates 231, 232 and 233, and Faraday rotator 234) are positioned within the magnet 204 in such a way that their circumferential surfaces are parallel to the axis of an incident beam and that their light entrance and exit faces are inclined with respect to that axis; thus, the optical isolator device 203 works as a polarization-independent optical isolator.

Figure 18A:
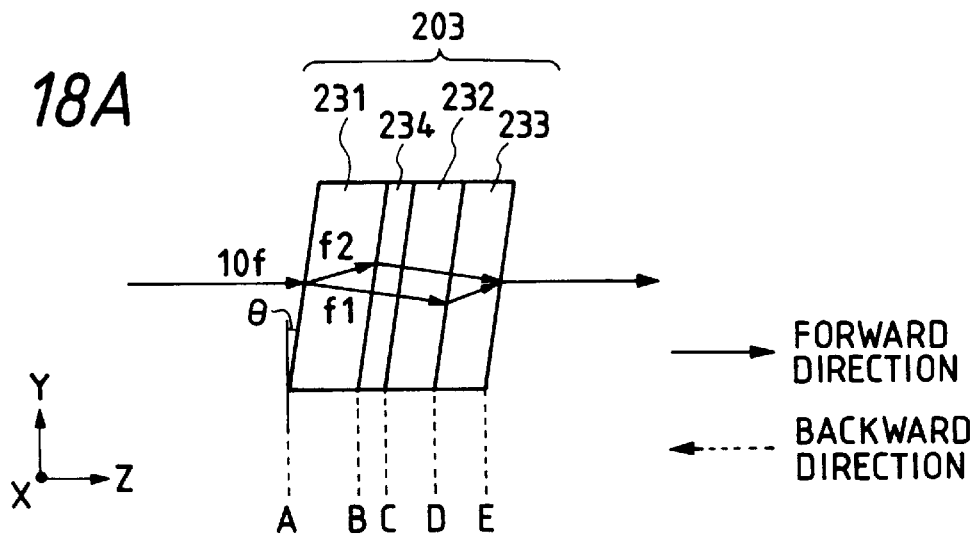
FIGS. 18A and 18B illustrate the operating principle of the isolator portion of FIG. 17 as far as forward travelling light is concerned.
Figure 18B:
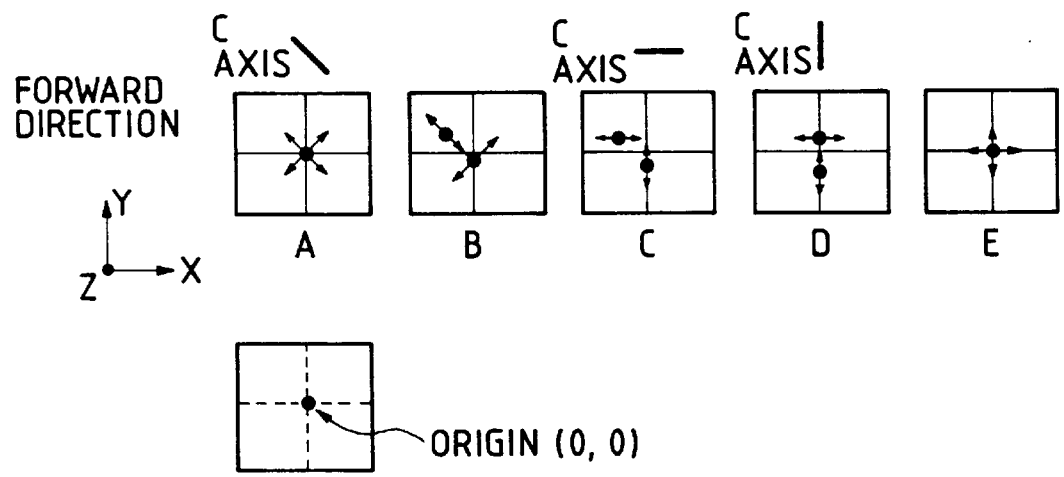

The operating theory of the polarization-independent optical isolator will now be explained with reference to FIGS. 18A and 18B. FIG. 18A shows conceptually how light travels through an optical isolator device 203 and FIG. 18B shows how light travels through the polarization-independent optical isolator in a forward direction when it is seen from the birefringent crystal plate 231; A–E correspond to the respective positions A–E in FIG. 18A; the dots represent the positions of respective light components and the arrows represent the directions of planes of polarization. The birefringent crystal plates 231, 232 and 233 have different thicknesses in the direction of light propagation and their ratio is $1:1/\sqrt{2}:1/\sqrt{2}$. The individual optical elements are adjusted for their optical axes and assembled into an integral unit such that it will operate as an optical isolator. The optical isolator device 203 as an integral assembly is oriented such that it is inclined at an angle of θ with a plane normal to the axis of incident light (i.e. parallel to the Y axis).

Suppose here that a light beam is incident on the birefringent crystal plate 231 at the origin (0,0) of the X-Y coordinate system and that the birefringent crystal plate 231 provides separation by polarization over a width of a. In the prior art case where the individual optical elements in the optical isolator are not provided in such a way that their light entrance and exit faces are not inclined with respect to the axis of incident light, the beam position at point E is offset from the origin as shown in FIG. 27. Stated more precisely, the beam position at point E is $(0, a/\sqrt{2})$ and the outgoing beam departs from the origin by $S=a/\sqrt{2}$. To correct this departure S, the optical isolator device is inclined with respect to a line crossed at right angles with the line connecting the origin and the position of the offset beam. If the thicknesses of the birefringent crystal plate 231 and the Faraday rotator 234 are written as $L_1$ and $L_2$, respectively, the angle of inclination θ is expressed as:

$$\tan\theta = \frac{S}{\frac{L_1 + \sqrt{2} L_1}{n} + \frac{L_2}{nf}}$$

where n is the refractive index of the birefringent crystal plate 231 and nf is the refractive index of the Faraday rotator 234.

If rutile crystal plates are used as the birefringent crystal plates ($L_1$=700 μm; n=2.6) and bismuth-substituted garnet as the Faraday rotator ($L_2$=400 μm; nf=2.3) to construct an optical isolator device, the angle of inclination θ can be adjusted to 3.4 degrees and the emerging beam will fall on the origin as shown in FIG. 18B.

To fabricate the optical isolator device 203 which works as the polarization-independent optical isolator, large substrates for the Faraday rotator and birefringent crystal plates may be subjected to optical adjustments, bonded together with an optical adhesive and cut to a size in which the respective components can be inserted into the magnet 204; therefore, a number of optical isolator devices 203 can be easily fabricated. In addition, after cutting the-substrates to provide an angle inclination at θ in a predetermined direction, one may simply provide the optical isolator device 203 within the bore of the magnet 204 to insure that the device 203 can be oriented in the desired position without requiring any cumbersome angular adjustments. As a further advantage, the unitary assembly of the necessary elements shortens the space of light propagation, thereby reducing the connection loss. If the Faraday rotator 234 which is made of a bismuth-substituted garnet is combined integrally with the birefringent crystal plates in the form of rutile crystal plates, the resulting optical isolator device 203 will have an effective thickness of about 700 μm which is satisfactory for practical purposes.

Figure 18C:
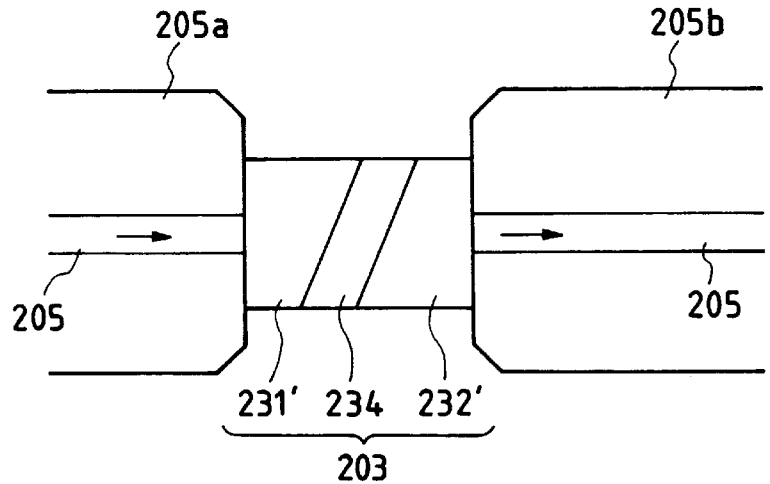
FIG. 18C shows schematically a modified construction of the isolator portion.

If desired, wedge-shaped birefringent crystal plates may be used to fabricate the optical isolator device 203 as shown in FIG. 18C. In the illustration, two wedgeshaped birefringent crystal plates 231' and 232' are positioned on opposite sides of the Faraday rotator 234 in such a way that their optical axes are oriented at 45 degrees with respect to the optical fiber 205. Light travelling in a forward direction emerges from the optical fiber 205 on the left side, passes through the birefringent crystal plate 231', Faraday rotator 234 and the birefringent crystal plate 232', from which it is launched as a parallel beam into the optical fiber 205 on the right side. Light travelling in a backward direction emerges from the optical fiber 205 on the right side, passes through the birefringent crystal plate 232', Faraday rotator 234 and the birefringent crystal plate 231', from which it emerges as a refracted beam that will not be launched into the optical fiber 205 on the left side.

Thus, the use of wedge-shaped birefringent crystal plates ensures that the light travelling in the forward direction will emerge from the optical isolator device 203 in such a way that it is parallel to the optical axis of the optical fiber 205 on the right side, thereby enabling efficient coupling to that optical fiber. On the other hand, the light travelling in the backward direction will emerge at an angle with the optical axis of the fiber 205 on the left side and is hardly launched into that optical fiber. If the birefringent crystal plates are made of a wedge-shaped rutile crystal, an even thinner optical isolator device can be fabricated, thereby allowing for a smaller insertion loss.

Figure 19:
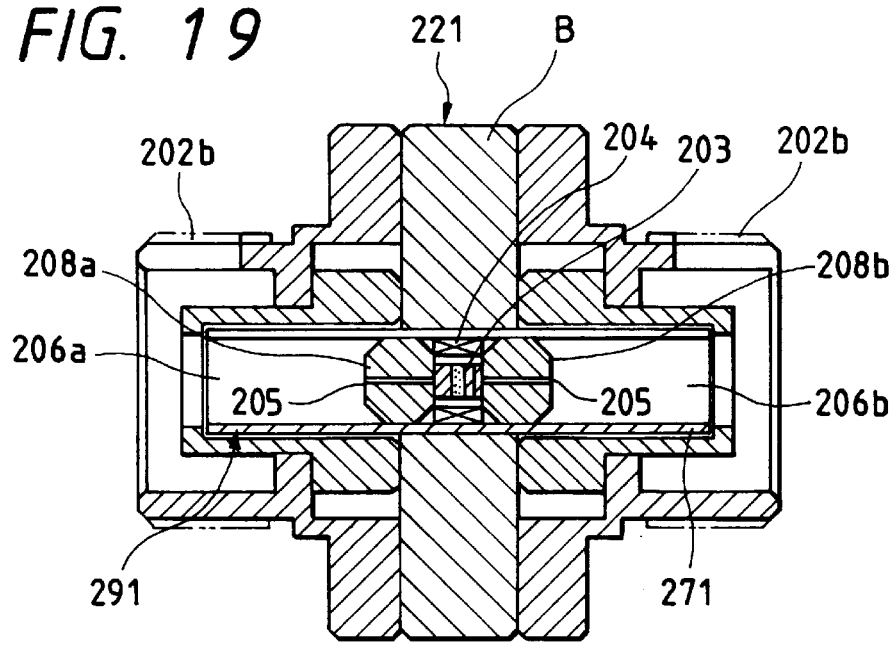
FIG. 19 is a sectional view showing an adapter-type optical isolator for use in another embodiment of the optical connector of the invention.

FIG. 19 is a sectional view showing an adapter-type optical isolator according to yet another embodiment of the invention. The adapter-type optical isolator generally indicated by 221 in FIG. 19 comprises an adapter housing B containing a split sleeve 271. The portions indicated by 202b form external threads. Ferrules 208a and 208b each hold a core-flared fiber 205 in an orifice. The ferrules are held in position along the optical axis in such a way that when they are inserted into the adaptertype optical isolator 221 through openings 206a and 206b, they will contact end faces of the polarization-independent optical isolator.

The polarization-independent optical isolator and the core-flared fibers in the isolator portion 291 are structurally essentially the same as the polarization-independent optical isolator and the core-flared fibers which are components of the isolator portion 209 shown in FIG. 17.

Figure 20:
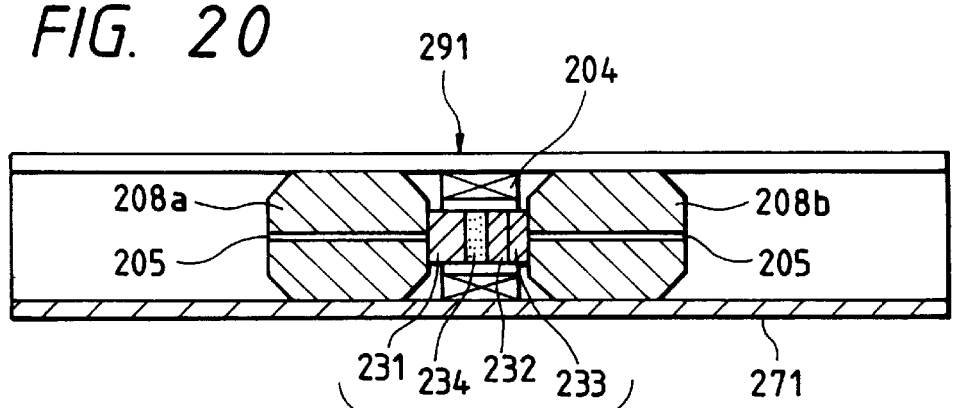
FIG. 20 is a sectional view showing the isolator portion of the adapter-type optical isolator shown in FIG. 19.

FIG. 20 is a sectional view showing the isolator portion 291 of the adapter-type optical isolator 221. As shown, the isolator portion 291 is of such a structure that the polarization-independent optical isolator which is composed of a magnet 204 and an optical isolator device 203 and the ferrules 208a and 208b each holding the core-flared fiber 205 in the orifice are inserted and held within the split sleeve 271. The polarization-independent optical isolator has the individual elements of the optical isolator device 203 (i.e., birefringent crystal plates 231, 232 and 233 and Faraday rotator 234) positioned as an integral unit within the cylindrical magnet 204 in such a way that their light entrance and exit faces are inclined with respect to the axis of incident beam. The direction and angle of the inclination are the same as described with reference to FIG. 18.

The ferrules 208a and 208b have core-flared fibers 205 inserted therethrough and are positioned on opposite sides of the optical isolator device 203 in such a way that the flared core portion of each fiber 205 faces the device 203.

According to the example just described above, the polarization-independent optical isolator composed of the optical isolator device 203 and the magnet 204, as well as the ferrules 208a and 208b each holding the core-flared fiber 205 in the orifice are snugly fitted and secured within the bore of the split sleeve 271. Because of this design feature, the individual parts and components need not be precisely adjusted for assembly and, hence, the adapter-type optical isolator 221 can be fabricated in a very simple way.

Figure 21:
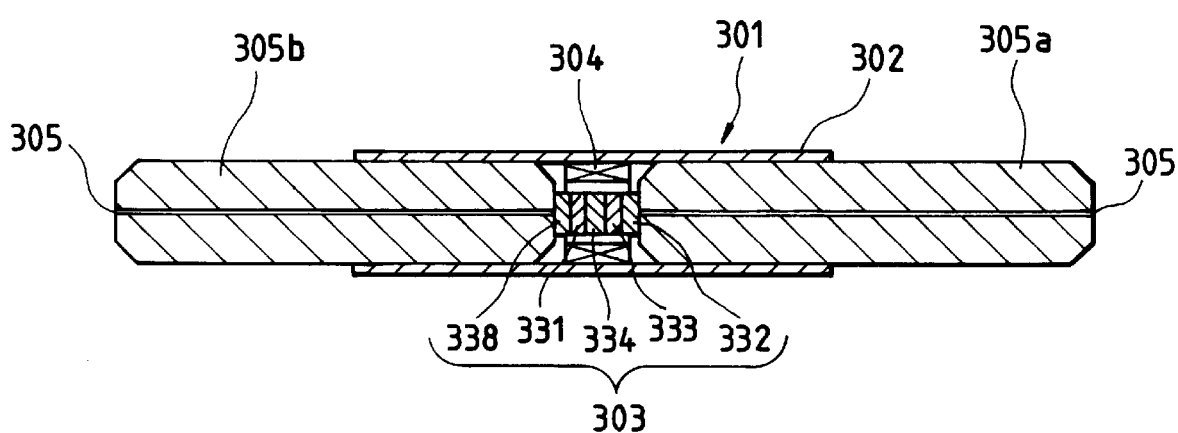
FIG. 21 is a sectional view showing an in-line optical isolator for use in yet another embodiment of the optical connector of the invention.

FIG. 21 is a sectional view showing an inline-type optical isolator of the invention. The inline optical isolator generally indicated by 301 in FIG. 21 comprises a sleeve 302 containing an optical isolator device 303, a hollow cylindrical magnet 304, ferrules 305a and 305b, and core-flared fibers.

The optical isolator device 303 is an integral assembly of a Faraday rotator 334, birefringent crystal plates 331 and 332, a half-wave plate 333 and a wavelength filter 338. To fabricate this optical isolator device 303, large substrates for the Faraday rotator, birefringent crystal plates, half-wave plate and narrow-band wavelength filter may be subjected to optical adjustments, bonded together with an optical adhesive and cut to a size in which the respective components can be inserted into the hollow cylindrical magnet 304; thus, a number of optical isolator devices 303 can be fabricated simultaneously and yet in a simple manner.

It should be added here that the use of the half-wave plate 333 contributes to a reduction in the overall device thickness and the unitary assembly of the necessary elements shortens the space of light propagation, thereby reducing the connection loss. Consider, for example, the case where the Faraday rotator 334 is made of a bismuth-substituted garnet, the birefringent crystal plates 331 and 332 are rutile crystal plates and the half-wave plate 333 is a quartz plate, with all these components being assembled into an integral unit. The resulting optical isolator device 303 has an effective thickness of about 700 $\mu$m which is satisfactory for practical purposes. It should also be added that both the rutile and quartz plates are within the definition of the term "birefringent crystal plate" as used herein.

The hollow cylindrical magnet 304 contains the Faraday rotator 334 in such a way that the latter is given a saturation magnetic field parallel to the optical axis. The hollow cylindrical magnet 304 combines with the optical isolator device 303 to make a polarization-independent optical isolator. The optical isolator device 303 and the hollow cylindrical magnet 304 are held within the bore of the sleeve 302.

Ferrules 305a and 305b each hold a core-flared fiber and they are snugly fitted within the sleeve 302 and fixed thereto by bonding with an adhesive. To this end, the ferrules are processed with a reasonable precision in outside diameter.

The thus fabricated inline optical isolator 301 is 4 mm in diameter and 30 mm long and, hence, is smaller than the conventional polarization-independent optical isolator.

Although not shown, both ends of the core-flared fiber 305 are pig-tailed to provide ease in connecting the optical isolator.

Figure 22:
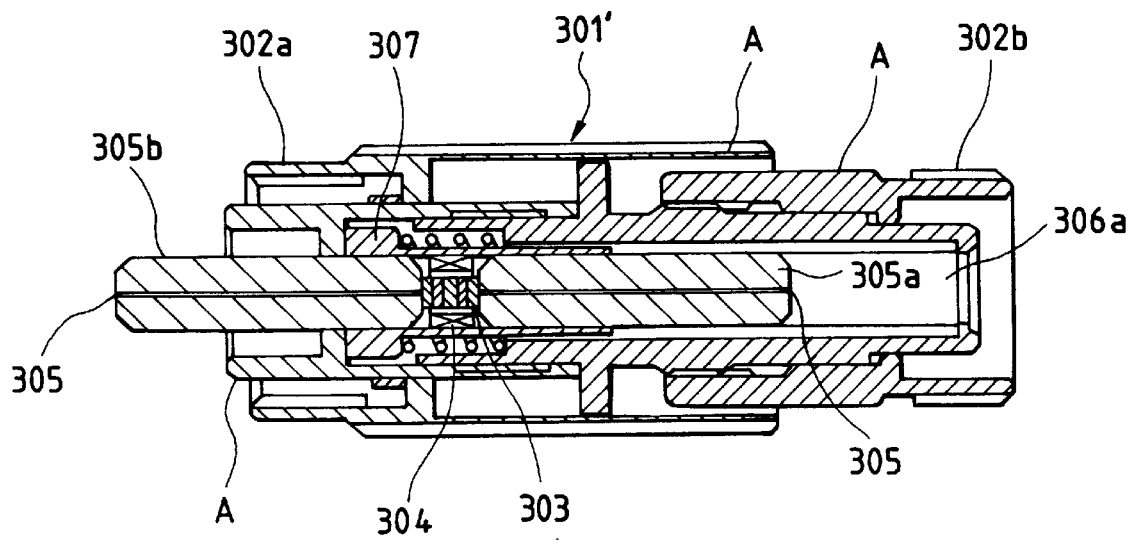
FIG. 22 is a sectional view showing a plug-type optical isolator for use in still another embodiment of the optical connector of the invention.
Figure 23:
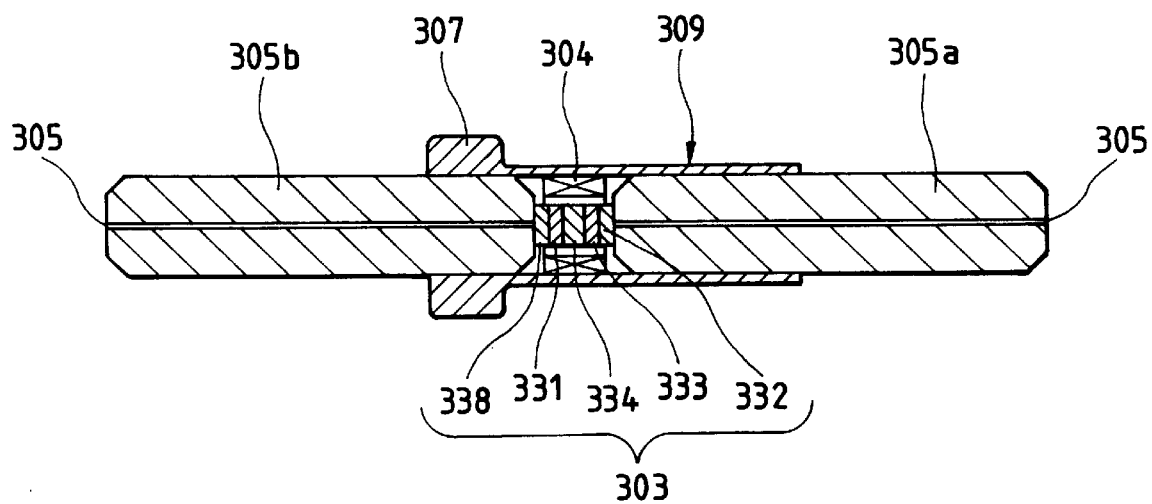
FIG. 23 is a sectional view showing the isolator portion of the optical plug-type isolator shown in FIG. 22.

FIG. 22 is a sectional view showing a plug-type optical isolator generally indicated by 301'. FIG. 23 is a sectional view showing the isolator portion 309 of the plug-type optical isolator 301'. In FIGS. 22 and 23, like parts or components are identified by like numerals.

The plug-type optical isolator 301' shown in FIG. 22 comprises a housing A containing a flange 307. The portions indicated by 302a and 302b form an internal thread and an external thread, respectively. An optical isolator device 303 is an integral assembly of a Faraday rotator, birefringent crystal plates, a half-wave plate and a narrow-band wavelength filter. A hollow cylindrical magnet 304 contains the Faraday rotator in such a way that the latter is given a saturation magnetic field parallel to the optical axis.

The hollow cylindrical magnet 304 combines with the optical isolator device 303 to make a polarization-independent optical isolator, which is held within the bore of the flange 307. Ferrules 305a and 305b each hold a core-flared fiber 305 in an orifice. These ferrules are held in position along the optical axis in such a way that when they are inserted into the plug-type optical isolator 301' through an opening 306a at an end of that isolator, they will contact an end face of the isolator. Ferrule 305b is such that its axial length provides a certain projection beyond the plug-type optical isolator 301' that complies with a specification.

Ferrules 305a and 305b are snugly fitted in the flange 307 and fixed thereto by bonding with an adhesive. To this end, the ferrules are processed with a reasonable precision in outside diameter. Hence, an optical communication system can be provided with a capability for optical isolation by merely connecting a conventional connector plug to the plug-type optical isolator 301' through the opening 306a while connecting the ferrule 305b to an adapter.

Figure 24:
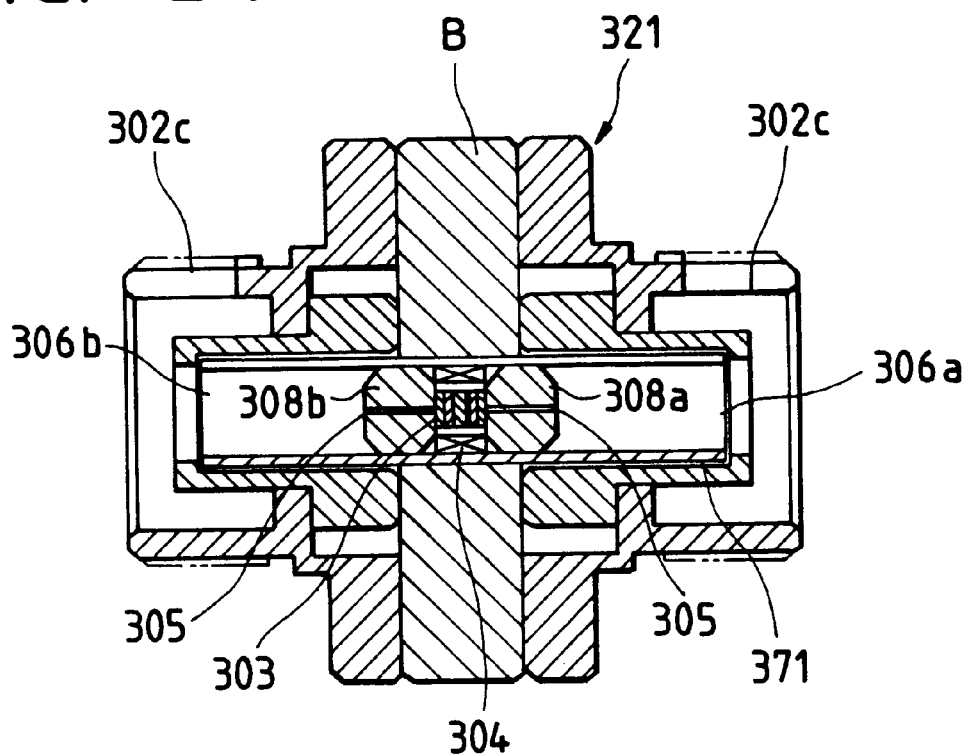
FIG. 24 is a sectional view showing an adapter type optical isolator for use in further embodiment of the optical connector of the invention.
Figure 25:
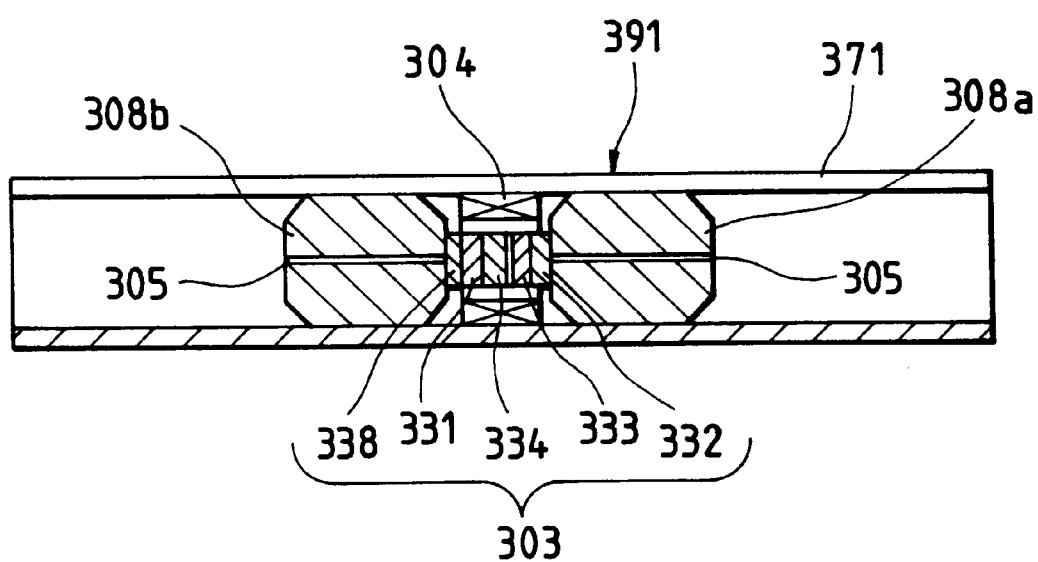
FIG. 25 is a sectional view showing the isolator portion of the adapter-type optical isolator shown in FIG. 24.
Figure 26:
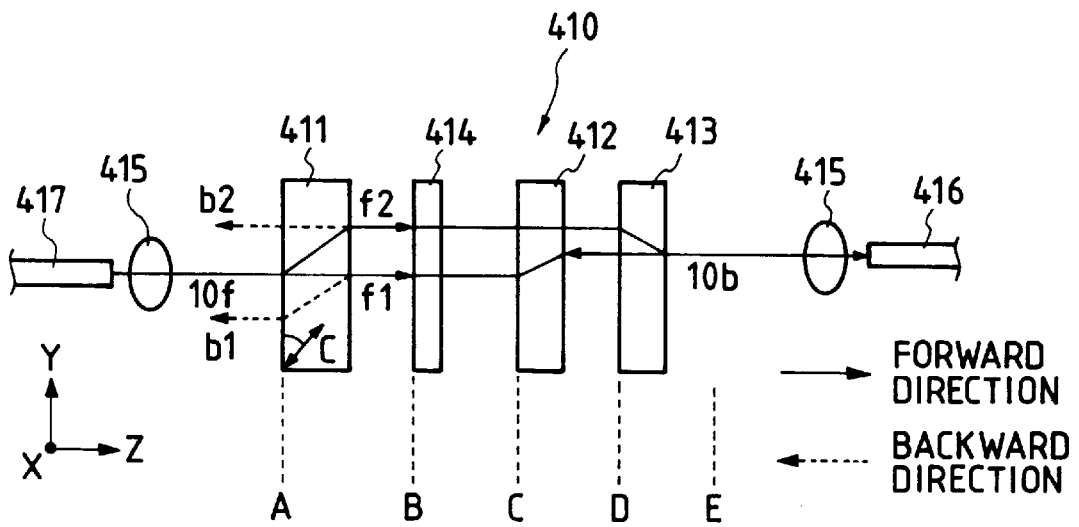
FIG. 26 shows the layout of a prior art polarization-independent optical isolator.

FIG. 23 is a sectional view showing the isolator portion 309 of the plug-type optical isolator 301' from which the housing A shown in FIG. 22 has been omitted. The optical isolator device 303 is an integral assembly of birefringent crystal plates 331 and 332, a half-wave plate 333, a Faraday rotator 334 and a narrow-band wavelength filter 38. The optical isolator device 303 is provided within the hollow cylindrical magnet 304 to work as a polarization-independent optical isolator. FIG. 24 is a sectional view showing an adaptertype optical isolator generally indicated by 321. FIG. 25 is a sectional view showing the isolator portion 391 of the adapter-type optical isolator 321.

The adapter-type optical isolator 321 shown in FIG. 24 comprises an adapter housing B containing a split sleeve 371. The portions indicated by 302c form external threads. Ferrules 308a and 308b each hold a core-flared fiber 305 in an orifice. The ferrules are held in position along the optical axis in such a way that when they are inserted into the adapter-type optical isolator 321 through openings 306a and 306b, they will contact the end faces of the polarization-independent optical isolator. While details of the polarization-independent optical isolator and core-flared fibers 305 in the isolator portion 391 will be given below with reference to FIG. 25, it should briefly be mentioned here that they are essentially the same as the polarization-independent optical isolator and the coreflared fibers that compose the isolator portion 309 shown in FIG. 23.

FIG. 25 is a sectional view showing the isolator portion 391 of the adapter-type optical isolator 321. As shown, the isolator portion 391 is of such a structure that the polarization-independent optical isolator which is composed of a hollow cylindrical magnet 304 and an optical isolator device 303 and the ferrules 308a and 308b each holding the core-flared fiber 305 in the orifice are held within the split sleeve 371. The polarization-independent optical isolator has the optical isolator device 303 provided within the hollow cylindrical magnet 304 and the optical isolator device 303 is an integral assembly of a Faraday rotator 334, birefringent crystal plates 331 and 332, a half-wave plate 333 and a narrow-band wavelength filter 338. The ferrules 308a and 308b have core-flared fibers 305 inserted therethrough and are positioned on opposite sides of the optical isolator device 303 in such a way that the flared core portion of each fiber 305 faces the device 303.

According to the examples described above, the polarization-independent optical isolator composed of the optical isolator device 303 and the hollow cylindrical magnet 304, as well as the ferrules 308a and 308b each holding the core-flared fiber 305 in the orifice are snugly fitted and secured within the bore of the sleeve, split sleeve, or flange. Because of this design feature, the individual parts and components need not be precisely adjusted for assembly and, hence, the adapter-type isolator 321 can be fabricated in a very simple way.

According to its first and general aspect, the present invention provides an optical connector comprising a tubular member and a polarization-independent optical isolator device contained therein which is an integral assembly of a Faraday rotator and birefringent elements. The optical connector is small and simple to use and exhibits a capability for low-loss polarization-independent optical isolation, thereby providing great ease in the connection of optical fibers.

If the polarization-independent optical isolator device is provided within a hollow cylindrical magnet which in turn is provided within the tubular member, the advantages are not limited to size reduction and an expensive Faraday rotator and birefringent element can be used in smaller cut sizes without using any additional parts such as holders. As a result, the optical connector of the invention can be provided in large quantities and at low cost.

If desired, a beam changing device may be provided at both ends of the polarization-independent optical isolator device which, in turn, is provided within a sleeve or a ferrule and this contributes to a further reduction in connection loss.

If a core-flared fiber is used as the beam changing device and provided at both ends of the optical isolator device in such a way the flared core portion of the fiber faces said device, the connection loss due to the distance between optical fibers can be further reduced. In addition, the absence of the need to use lenses contributes to the elimination of lens design and adjustment efforts.

In another embodiment, the birefringent elements in the polarization-independent optical isolator device may be designed as structurally birefringent elements and this contributes to a further reduction in the thickness of the optical isolator device and, hence, the overall size of the optical connector. What is more, the length of the space for light propagation through the optical isolator device is shortened, so is the distance between optical fibers and this contributes to a further reduction in connection loss.

According to its second aspect, the present invention provides an optical connector comprising a tubular member which has contained therein a polarization-independent optical isolator device which is an integral assembly of a Faraday rotator, birefringent crystal plates and a half-wave plate, a hollow cylindrical magnet and ferrules each holding a core-flared fiber. The optical connector is small and simple to use and exhibits a capability for low-loss polarization-independent optical isolation, thereby providing great ease in the connection of optical fibers. The advantages are in no way limited to size reduction and an expensive Faraday rotator and birefringent crystal plate can be used in smaller cut sizes without using any additional parts such as holders. As a result, the optical connector of the invention can be provided in large quantities and at low cost.

In addition, the use of the half-wave plate in the polarization-independent optical isolator device contributes to a further reduction in the thickness of the optical isolator device and, hence, the overall size of the optical connector. What is more, the length of the space for light propagation through the optical isolator device is shortened, so is the distance between optical fibers and this contributes to a further reduction in connection loss. In addition, the isolator structurally allows emerging light to fall on the axis of incident light, so there is no need to perform precise adjustments on the positions of the ferrules holding core-flared optical fibers and low-loss connection is realized by merely holding the individual components in alignment within the tubular member such as a flange or a sleeve without any additional adjustments.

According to its third aspect, the present invention provides an optical connector comprising a sleeve which has contained therein a polarization-independent optical isolator device which is an integral assembly of a Faraday rotator, birefringent crystal plates and a wavelength filter, a hollow cylindrical magnet and ferrules each holding a core-flared fiber. The optical connector is small and simple to use and yet exhibits a capability for filtering wavelengths. The advantages are in no way limited to size reduction and an expensive Faraday rotator and birefringent crystal plate can be used in smaller cut sizes without using any additional parts such as holders. As a result, the optical connector of the invention can be provided in large quantities and at low cost.

If the optical isolator device containing the wavelength filter as an integral part is incorporated into a fiber optics amplifier, unwanted ASE (amplified spontaneous emission) can be rejected without using any additional wavelength filter; hence, high-performance fiber optics amplifier can be constructed with a simple parts composition.

In addition, the core-flared fiber is provided at both ends of the optical isolator device in such a way that the flared core portion of the fiber faces said device. This eliminates the need for using lenses and, hence, the alignment characteristic of the individual parts is sufficiently improved to obviate the need for cumbersome fine adjustments.

What is more, the individual elements are assembled by bonding to fabricate the optical isolator device as an integral unit and this contributes to a further reduction in the thickness of the optical isolator device and, hence, the overall size of the optical connector. What is more, the length of the space for light propagation through the optical isolator device is shortened, so is the distance between optical fibers and this contributes to a further reduction in connection loss. In addition, the isolator structurally allows emerging light to fall on the axis of incident light, so there is no need to perform precise adjustments on the positions of the ferrules holding core-flared optical fibers and low-loss connection is realized by merely holding the individual components in alignment within the tubular member such as a flange or a sleeve without any additional adjustments.

What is claimed is:

1. An optical connector, comprising:
   a sleeve having opposing ends;
   an optical fiber holding ferrule disposed in each of the opposing ends of the sleeve, the optical fiber holding ferrule having an end face; and
   an integrally assembled polarization independent optical isolator device provided in the sleeve, the optical isolator device having at least one end face that comes in contact with the end face of the optical fiber holding ferrule and comprising at least one Faraday rotator and at least one birefringent crystal element, the Faraday rotator and the birefringent crystal element being integrally assembled and defining circumferential surfaces that are parallel to an axis of incident light, and a light entrance face and a light exit face that are inclined relative to the axis of incident light.

2. An optical connector of claim 1, wherein the optical fiber holding ferrule holds an optical fiber, and the sleeve has an internal surface and the optical fiber holding ferrule has an external surface that is in contact with the internal surface of the optical fiber holding ferrule, wherein the internal surface of the sleeve and the external surface of the optical fiber holding ferrule optically align the optical fiber held by the optical fiber holding ferrule with the optical isolator device when the optical fiber holding ferrule is in contact with the optical isolator device.

3. An optical connector of claim 1, wherein the optical isolator device has two ends and wherein a beam changing element is provided at each of the two ends of the optical isolator device, the beam changing element having an end face that is in contact with each of the two ends of the optical isolator device.

4. An optical connector of claim 3, further comprising a beam changing element, the beam changing element having two end faces, wherein one of the two end faces of the beam changing element is in contact with the end face of the optical fiber holding ferrule, and the other of the two end faces of the beam changing element is in contact with the end face of the optical fiber holding ferrule.

5. An optical connector of claim 4, wherein the optical fiber holding ferrule holds an optical fiber, and the sleeve has an internal surface and the optical fiber holding ferrule has an external surface that is in contact with the internal surface of the optical fiber holding ferrule, wherein the internal surface of the sleeve and the external surface of the optical fiber holding ferrule optically align the optical fiber held by the optical fiber holding ferrule with the optical isolator device when the optical fiber holding ferrule is in contact with the beam changing element.

6. An optical connector of claim 1, where the ferrule holds a fiber collimator prepared by fusion-splicing a graded-index fiber and a single-mode fiber, and the polarization-independent optical isolator device is an integral assembly of at least one Faraday rotator and at least two birefringent crystal plates.

7. An optical connector of claim 4, wherein the birefringent crystal plates are wedge-shaped.

8. An optical connector of claim 4, wherein the optical isolator device comprises at least one half-wave plate.

9. An optical connector of claim 4, wherein the optical isolator device comprises at least one wavelength filter.

10. An optical connector of claim 1, wherein the Faraday rotator and the birefringent crystal element are bonded together by an optical adhesive.

11. An optical connector of claim 1, further comprising two core-flared optical fibers, each of the core-flared optical fibers being held by the optical fiber holding ferrule, the optical fiber holding ferrule is positioned and held by the sleeve upon insertion of the ferrule into the sleeve.

12. An optical connector of claim 11, wherein the optical isolator device is provided within a hollow cylindrical magnet which is provided within the at least one of flange or sleeve.

13. An optical connector of claim 12, wherein the birefringent crystal plates are wedge-shaped.

14. An optical connector of claim 13, wherein the optical isolator device comprises at least one half-wave plate.

15. An optical connector of claim 13, wherein the optical isolator device comprises at least one wavelength filter.

16. An optical connector of claim 2, wherein the optical fiber is composed of a single-mode fiber and a graded-index fiber fused to one end of the single mode fiber.

17. An optical connector of claim 2, wherein the optical fiber is a core-flared optical fiber.

18. A method of making an optical connector, the method comprising the steps of:

providing a sleeve having a bore;

bonding at least one Faraday rotator and at least one birefringent crystal element together to form an integrally assembled polarization independent optical isolator device; and fitting the integrally assembled polarization independent optical isolator device in the sleeve.

19. A method of claim 18, wherein the at least one Faraday rotator and at least one birefringent crystal element are optically aligned with one another, bonded together with an optical adhesive and cut to a specified size to form the integrally assembled polarization independent optical isolator device before the integrally assembled polarization independent optical isolator device is fitted in the sleeve.

20. A method of claim 19, wherein the integrally assembled polarization independent optical isolator device includes at least one half-wave plate.

21. A method of claim 19, wherein the integrally assembled polarization independent optical isolator device includes at least one wavelength filter.

22. A method of claim 19, further comprising the steps of inserting the integrally assembled polarization independent optical isolator within a bore of a magnet and placing the magnet retaining the integrally assembled polarization independent optical isolator therein in the sleeve.

23. A method of claim 18, further comprising the steps of fitting at least one optical fiber holding ferrule holding an optical fiber in the sleeve and bringing one end of the at least one optical fiber holding ferrule in contact with the integrally assembled polarization independent optical isolator device to thereby optically align the optical fiber with the integrally assembled polarization independent optical isolator device.

24. A method of claim 18, further comprising the steps of fitting at least one beam changing element in the sleeve and bringing the beam changing element in contact with one end of the integrally assembled polarization independent optical isolator device.

25. A method of claim 24, further comprising the steps of fitting at least one optical fiber holding ferrule holding an optical fiber in the sleeve and bringing one end of the at least one optical fiber holding ferrule in contact with the at least one beam changing element to thereby optically align the optical fiber with the integrally assembled polarization independent optical isolator device.

26. A method of claim 18, further comprising the steps of providing the at least one Faraday rotator and the at least one birefringent crystal element with circumferential surfaces that are parallel to an axis of incident light, and a light entrance face and a light exit face that are inclined relative to the axis of incident light.

* * * * *